(12) United States Patent
Teramoto et al.

(10) Patent No.: US 9,480,136 B2
(45) Date of Patent: Oct. 25, 2016

(54) EXTREME UV RADIATION LIGHT SOURCE DEVICE

(71) Applicant: USHIO DENKI KABUSHIKI KAISHA, Tokyo (JP)

(72) Inventors: Yusuke Teramoto, Aachen (DE); Gota Niimi, Shizuoka (JP); Takahiro Hiraoka, Hyogo (JP); Pieter Goldhoorn, Aachen (DE)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/786,057

(22) PCT Filed: Apr. 24, 2014

(86) PCT No.: PCT/JP2014/002306
§ 371 (c)(1),
(2) Date: Oct. 21, 2015

(87) PCT Pub. No.: WO2014/178177
PCT Pub. Date: Nov. 6, 2014

(65) Prior Publication Data
US 2016/0073486 A1  Mar. 10, 2016

(30) Foreign Application Priority Data

Apr. 30, 2013  (JP) ................. 2013-095235

(51) Int. Cl.
*H05G 2/00*  (2006.01)
(52) U.S. Cl.
CPC .............. *H05G 2/008* (2013.01); *H05G 2/005* (2013.01)
(58) Field of Classification Search
CPC .............................. H05G 2/008; H05G 2/005

USPC ....................................................... 250/504 R
See application file for complete search history.

(56) References Cited

U.S. PATENT DOCUMENTS

| 6,973,164 B2 | 12/2005 | Hartlove et al. |
| 7,427,766 B2 | 9/2008 | Jonkers et al. |

(Continued)

FOREIGN PATENT DOCUMENTS

| JP | 2003-257698 A | 9/2003 |
| JP | 2005-017274 A | 1/2005 |

(Continued)

OTHER PUBLICATIONS

International Search Report issued in Application No. PCT/JP2014/002306, mailed Jul. 22, 2014.

*Primary Examiner* — Michael Maskell
(74) *Attorney, Agent, or Firm* — Studebaker & Brackett PC

(57) ABSTRACT

An extreme ultraviolet light source device includes a raw material supplying mechanism. The raw material supplying mechanism includes a disk-shaped rotor, a motor for causing the rotor to rotate, a cover-shaped structure surrounding the rotor via a gap, and a first reservoir provided inside the cover-shaped structure for reserving a liquid high temperature plasma raw material. When the rotor rotates, a portion of the surface on the rotor becomes coated with the liquid high temperature plasma raw material. A portion of the cover-shaped structure has an aperture exposing that surface of the rotor which coated with the high temperature plasma raw material. The high temperature plasma raw material is irradiated with an energy beam from an energy beam supply device through the aperture, and generates EUV radiation.

7 Claims, 9 Drawing Sheets

(56) References Cited

U.S. PATENT DOCUMENTS

| | | |
|---|---|---|
| 8,154,000 B2 | 4/2012 | Hergenhan et al. |
| 8,368,305 B2 * | 2/2013 | Zhokhavets ........... H05G 2/005 250/504 R |
| 2007/0090304 A1 * | 4/2007 | Jonkers .................. H05G 2/003 250/504 R |
| 2011/0133621 A1 * | 6/2011 | Zhokhavets .............. H01J 1/88 313/46 |

FOREIGN PATENT DOCUMENTS

| | | |
|---|---|---|
| JP | 2007-005124 A | 1/2007 |
| JP | 2007-505460 A | 3/2007 |
| JP | 2007-200919 A | 8/2007 |
| JP | 2007-529869 A | 10/2007 |
| JP | 2010-514214 A | 4/2010 |
| JP | 2010-263210 A | 11/2010 |
| JP | 2010-541123 A | 12/2010 |
| JP | 2012-235043 A | 11/2012 |
| WO | 2005/025280 A2 | 3/2005 |
| WO | 2005/089130 A2 | 9/2005 |
| WO | 2008/088488 A1 | 7/2008 |
| WO | 2009/077943 A1 | 6/2009 |

* cited by examiner

EXTREME UV RADIATION LIGHT SOURCE DEVICE

TECHNICAL FIELD

The present invention relates to an extreme UV (ultraviolet) radiation light source device, and more particularly an extreme UV radiation light source device that includes a raw material supplying mechanism to supply a liquid or solid raw material in order to emit extreme UV light from laser-produced plasma.

BACKGROUND ART

As semiconductor integrated circuits are designed in a fine structure and/or in a highly integrated manner, there is a demand for improving resolution (resolution power) of a projection exposure device that is used to manufacture such semiconductor integrated circuits. To meet such demand, a light source for exposure tends to have an even shorter wavelength. As a next generation light source for exposure of semiconductor, which comes after an excimer laser device, an extreme ultraviolet (EUV) light source device is studied. Such light source device can emit extreme ultraviolet light at a wavelength between 13 nm and 14 nm, particularly 13.5 nm. The EUV light source device is also used as a light source for inspecting (testing) a mask used for a projection exposure device that uses EUV light.

There are some known methods for the EUV light source device to generate (emit) the extreme ultraviolet light. One of the known methods heats an EUV radiation species (seed) for excitation. This generates a high temperature plasma. Then, the extreme ultraviolet (EUV) light is radiated and extracted from the high temperature plasma.

One kind of the EUV light source devices that employ such method is a discharge produced plasma (DPP) type EUV light source device. The DPP type EUV light source device utilizes the EUV radiation light from the high temperature plasma generated when the EUV light source device is driven with an electric current.

Li (lithium) and Sn (tin) draw attention as radiation species (seed) that are used by the EUV light source device to emit an EVU light at a wavelength of 13.5 nm and having a strong radiation intensity. In other words, Li and Sn draw attention as the high temperature plasma raw material for producing the EUV. The mechanism of the EUV radiation that relies upon the DPP method will be described briefly below.

According to the DPP method, electrodes are placed in, for example, a discharge vessel, and the discharge vessel is filled with a raw material gas (i.e., gaseous high temperature plasma raw material atmosphere). Then, discharge is caused to take place between the electrodes in the high temperature plasma raw material atmosphere so as to produce initial plasma. A self magnetic field results from an electric current that flows between the electrodes upon the discharging, and causes the initial plasma to shrink. As a result, the density of the initial plasma increases, and the plasma temperature steeply rises. This phenomenon is referred to as "pinch effect" hereinafter. Heating caused by the pinch effect elevates the plasma temperature. The ion density of the high (elevated) temperature plasma is $10^{17}$ to $10^{20}$ cm$^{-3}$, and the electron temperature reaches approximately 20 to 30 eV. Then, the EUV light is emitted from the high temperature plasma.

In recent years, the DPP type EUV light source device uses solid or liquid Sn or solid or liquid Li. The solid or liquid Sn or Li is supplied to the surfaces of the electrodes, across which the discharge takes place, and irradiated with an energy beam such a laser beam for vaporization. Subsequently, the high temperature plasma is generated by the discharging. This is proposed in Patent Literature 1 (Japanese Patent Application Laid-Open Publication No. 2007-505460). The following description deals with when the energy beam is a laser beam. This method is referred to as "LDP" method or "laser assisted gas discharge produced plasma" method in this specification.

Now, an LDP type EUV light source device disclosed in Patent Literature 1 (Japanese Patent Application Laid-Open Publication No. 2007-505460) will be described. FIG. 11 of the accompanying drawings shows a cross-sectional view of the EUV light source device disclosed in Patent Literature 1 (Japanese Patent Application Laid-Open Publication No. 2007-505460).

Reference numerals 114 and 116 designate disk-like electrodes. The electrodes 114 and 116 are disposed in a discharge space 112. The inner pressure of the discharge space 112 is regulated to a predetermined pressure. The electrodes 114 and 116 are spaced from each other by a predetermined distance, and rotate about rotation axes 146, respectively. Reference numeral 124 designates a high temperature plasma raw material 124 to emit EUV light at a wavelength of 13.5 nm. The high temperature plasma raw material 124 is a heated and melted metal, e.g., liquid tin, and is received in containers 126. The temperature of the melted metal 124 is regulated by a temperature adjusting unit 130 disposed in each of the containers 126.

The electrodes 114 and 116 are partially immersed in the melted metal 124 in the associated containers 126, respectively. The melted metal 124 that rides on the surface of each of the electrodes 114 and 116 is moved into the discharge space 112 upon rotation of the electrode 114, 116. The melted metal 124 which is conveyed into the discharge space 112, i.e., the melted metal 124 present on the surface of each of the electrodes 114 and 116 which are spaced from each other by the predetermined distance in the discharge space 112, is irradiated with the laser beam 120 emitted from a laser irradiation device (not shown). Upon irradiation with the laser beam 120, the melted metal 124 is vaporized.

While the melted metal 124 14 is being vaporized, a pulse electric power is applied to the electrodes 114 and 116. Thus, a pulse discharge is triggered in the discharge space 112, and a plasma 122 is produced. A large current is caused to flow upon the discharging. The large current heats and excites the plasma 112 such that the plasma temperature is elevated. As a result, the EUV radiation (EUV light) is generated from the high temperature plasma. The EUV radiation is taken out in the upper direction in the drawing.

Therefore, when the LDP method described in Patent Literature 1 (Japanese Patent Application Laid-Open Publication No. 2007-505460) is used, the solid or liquid target (high temperature plasma raw material) is irradiated with a laser beam, and the raw material is gasified (vaporized) to produce a gaseous high temperature plasma raw material atmosphere (initial plasma). Similar to the DPP method, the ion density in the initial plasma is, for example, approximately $10^{16}$ cm$^{-3}$, and the electron temperature is, for example, approximately 1 eV or lower than 1 eV. Subsequently, the plasma temperature is elevated with the heating triggered by the discharge current drive. The ion density in this high temperature plasma becomes approximately $10^{17}$ cm$^{-3}$ to $10^{20}$ cm$^{-3}$, and the electron temperature becomes approximately 20 eV to 30 eV. As such, this high temperature plasma emits the EUV. Similar to the DPP method, therefore, the heating triggered by the discharge current drive in the LDP method, which is disclosed in Patent Literature 1 (Japanese Patent Application Laid-Open Publication No. 2007-505460), takes advantage of the pinch effect.

Reference numeral 148 designates a capacitor bank, which corresponds to a power source. The capacitor bank 148 is electrically connected to the melted metal 124, which is received in each of the containers 126, via insulated feed lines 150. Because the melted metal 124 is conductive, the electric energy is supplied to the electrodes 114 and 116, which are partly immersed in the melted metal 124, from the capacitor bank 148 via the melted metal 124.

According to this method, it is easy to vaporize tin or lithium, which is solid at room temperature, in the vicinity of the discharge region where the discharge takes place. Specifically, it is possible to efficiently feed the vaporized tin or lithium to the discharge region, and therefore it becomes possible to efficiently extract the EUV radiation at the wavelength of 13.5 nm after the discharging.

The EUV light source device disclosed in Patent Literature 1 (Japanese Patent Application Laid-Open Publication No. 2007-505460) has the following advantages because the electrodes are caused to rotate.

(i) It is possible to always feed a solid or liquid high temperature plasma raw material to the discharge region. The high temperature plasma raw material is a new EUV producing species (seeds).

(ii) Because that position on each electrode surface, which is irradiated with the laser beam, and the position of the high temperature plasma generation (position of the discharge part) always change, the thermal load on each electrode reduces, and therefore it is possible to reduce or prevent the wear of the electrodes.

An EUV light source device that uses another method is an LPP (Laser Produced Plasma) type EUV light source device. A mechanism for generating the EUV radiation on the basis of the LPP method will be described briefly below.

When the LPP method is used, a target is irradiated with a driver laser beam to produce the plasma. The material of the target is the high temperature plasma raw material that can generate the EUV. Similar to the LDP method, Li (lithium) and Sn (tin) draw attention as the material of the target. An EUV light source device that relies upon the LPP method, which is disclosed in Patent Literature 2 (Japanese Patent Application Laid-Open Publication No. 2007-529869), will be described below.

FIG. 12 of the accompanying drawings shows a conceptual view of the laser produced plasma EUV light source 220, which is illustrated in FIG. 1 of Patent Literature 2 (Japanese Patent Application Laid-Open Publication No. 2007-529869). The driver laser for generating the plasma may include a pulse laser system 222 (e.g., gas discharge excimer laser that is driven with high power and high pulse repeating frequency), a $CO_2$ laser or a fluorine molecule laser.

The pulse laser system 222 is, for example, a gas discharge laser system that has a master oscillator power amplifier (MOPA) structure. The gas discharge laser system includes, for example, an oscillator laser system 244 and an amplifier laser system 248. The pulse laser system 222 has magnetic reactor switching type pulse compressing and timing circuits 250 and 252, and pulse power timing monitoring systems 254 and 256.

The light source 220 may also include a target conveying system 224 that conveys the target in the form of, for example, a droplet, a solid particle, or a solid particle contained in a droplet. The target may be conveyed into, for example, a chamber 226 by the target conveying system 224. The target may also be conveyed to an irradiation site 228, which is also known as an ignition site, by the target conveying system 224. Although not described in detail here, a system controller 260 conducts the control such that the target is irradiated with a laser pulse from the pulse laser system 222 along a laser beam axis 255 when the target is in a predetermined location.

The device disclosed in Patent Literature 2 (Japanese Patent Application Laid-Open Publication No. 2007-529869) detects a location of the target with, for example, droplet photographing (videotaping) devices 270, 272 and 274. Then, a feedback system 262 for detecting the target location is used to calculate the location and moving path (locus) of the target. Based on these pieces of information, the system controller 260 controls the position and direction of the laser beam. A target conveyance controlling system 290 corrects the releasing point of the target droplet 294, which is released by the target conveying mechanism 292, in response to a signal from the system controller 260.

In recent years, as described above, the target material is usually supplied in the form of droplet. The LPP method disclosed in Patent Literature 2 (Japanese Patent Application Laid-Open Publication No. 2007-529869) is believed to provide a light source that has power scalability and produces less debris (clean light source).

Such target conveying system needs to control the droplet size as well as, in terms of space and time, the laser beam irradiation position, and the feeding of the droplet. Such control is likely to be affected by disturbances, i.e., the temperature elevation caused by the plasma, and scattering of the target material and its residual upon the laser beam irradiation. The detail of such control system is described in Patent Literature 2 (Japanese Patent Application Laid-Open Publication No. 2007-529869).

It is said that the LPP method properly controls the target and creates less debris. However, it is recently said that even the LPP method exerts a large (unneglectable) influence on optical components when the LPP method intend to provide an output required from a semiconductor manufacturing process.

To date, the researches show that both of the LDP method and the LPP method use liquid tin (Sn) when a raw material for the high temperature plasma is supplied to generate EUV radiation. However, the LDP method has problems. Namely, scattering of tin and releasing of the electrode materials occur during vaporization of the raw material upon laser beam irradiation and discharge.

In the LPP method, which is considered to be a cleaner method than the LDP method, the tin scatters when the droplets are produced and the tin is irradiated with the laser beam. This produces a considerable amount of particles and ions, which deteriorate the life of the optical system. These particles and ions are called debris. When the output of the EUV radiation is enhanced, the debris is produced in a larger amount. This becomes a cause of significantly deteriorating the life of those optical components which are disposed downstream of the light emitting point.

LISTING OF REFERENCES

Patent Literatures

PATENT LITERATURE 1: Japanese Patent Application Laid-Open Publication No. 2007-505460

PATENT LITERATURE 2: Japanese Patent Application Laid-Open Publication No. 2007-529869

PATENT LITERATURE 3: PCT International Publication No. 2009/077943

PATENT LITERATURE 4: Japanese Patent Application Laid-Open Publication No. 2007-5124

PATENT LITERATURE 5: Japanese Patent Application Laid-Open Publication No. 2005-17274

PATENT LITERATURE 6: Japanese Patent Application Laid-Open Publication No. 2010-514214

PATENT LITERATURE 7: Japanese Patent Application Laid-Open Publication No. 2012-235043

SUMMARY OF THE INVENTION

Problems to be Solved by the Invention

The problems of the conventional ways of supplying the high temperature plasma raw material will be summarized below.

Firstly, use of the solid target is proposed in the method of supplying the high temperature plasma raw material for the EUV light source. When this method is used in the DPP method, the discharge electrodes themselves are made from the solid high temperature plasma raw material. When this method is used in the LPP method, the solid high temperature plasma raw material, which is prepared, for example, in the form of wire, is disposed as the target for the laser beam.

This raw material supplying method does not need a complicated mechanism. However, when this raw material supplying method is used in the DPP method, the discharge electrodes are worn down upon the discharge, and the distance between the electrodes changes. This results in unstable EUV generation in a long run. When this raw material supplying method is used in the LPP method, the material is damaged by the laser beam when the material is irradiated with the laser beam. Therefore, it is difficult to supply the raw material for a long time.

In addition, the light emitting part (plasma generating portion) is difficult to cool. Accordingly, it is difficult to suppress the wearing out of the electrodes in the DPP method, and suppress the damage to the target due to the heat in the LPP method.

Next, use of the gas target is proposed in the LPP method. This method of supplying a raw material includes supplying a xenon gas or a vaporized or gaseous tin, which is a high temperature plasma raw material, from a nozzle into a EUV generation chamber in the form of a gas jet. The gas jet is irradiated with a driver laser beam for plasma generation. Unlike the solid target, this raw material supplying method does not suffer from a problem of wearing out of the material because the high temperature plasma raw material is supplied in the form of gas jet in this raw material supplying method.

It is necessary to expel that portion of the supplied gas jet of the high temperature plasma raw material, which does not contribute to the EUV generation. Specifically, unlike the solid target, this raw material supplying method requires a nozzle for supplying the gaseous high temperature plasma raw material, and a separate gas-expelling mechanism for expelling the gaseous high temperature plasma raw material.

However, part of the gas that contains the vaporized tin, for example, is liquefied and solidified in the EUV generation chamber, and therefore it is difficult to expel the high temperature plasma raw material.

In addition, because the gas jet spreads after it is injected from the nozzle, it is difficult to locally supply the high temperature plasma raw material. When the gas jet is irradiated with the driver laser beam, it is impossible to generate a small plasma for light emission (small light-emitting plasma).

Furthermore, it is difficult to cool the nozzle, which is located in the vicinity of the high temperature plasma. Thus, the nozzle itself is likely to be damaged.

On the other hand, one of the raw material supplying methods that are currently practiced in the LDP method is disclosed in Patent Literature 1 (Japanese Patent Application Laid-Open Publication No. 2007-505460). This raw material supplying method includes immersing disc-shaped electrodes in tin tanks, respectively, and causing the electrodes to rotate such that each of the electrodes is coated with a thin film of the liquid tin, and the plasma raw material is introduced to the light emission point. This raw material supplying method introduces the tin as the plasma raw material, while cooling the electrodes and surrounding components with the liquid tin. However, this raw material supplying method needs an increased electric power and entails an increased amount of tin that contributes to the light emission. An amount of tin to be applied onto the rotating electrode(s) is limited by the rotating speed of the electrode concerned. This is because the rotation speed of the electrode needs to be increased in order to smoothly introduce the tin to the plasma, but this creates another problem, i.e., a centrifugal force increases with the increasing rotation speed of the electrode, and the increased centrifugal force causes the tin on the rotating electrode to scatter in the discharge space. Also, it is difficult to maintain the good contact (wettability) between the electrode and the tin when forming a thin film of tin on the electrode material.

Another raw material supplying method that is currently practiced in connection with the LPP method is a droplet method disclosed in Patent Literature 2 (Japanese Patent Application Laid-Open Publication No. 2007-529869). Because this raw material supplying method uses a dispersed (discrete) target, the device becomes complicated. Specifically, the device becomes complicated because the target is difficult to synchronize with the excitation source (driver laser beam for plasma generation) in terms of time and space, the target is difficult to have a small size, the luminous efficacy drops if the target has an excessively small size, heat generation of the light emitting part influences a droplet producing device, and high pressure such as about 200 atmospheric pressure is needed to release the droplet. Variations in the material feeding in terms of time and space make it difficult to stably supply the material. Thus, the dose control is difficult. In addition, the tin and its ion scatter when the target is irradiated with the laser beam, in the same manner as the above-described raw material supplying method that uses the rotating electrodes.

Still another method of supplying the high temperature plasma raw material in the LPP method is disclosed in Patent Literature 3 (PCT International Publication No. 2009/077943). Patent Literature 3 (PCT International Publication No. 2009/077943) uses disc-shaped rotating elements (rotors), which are partly immersed in the liquid high temperature plasma raw material, as a mechanism for supplying the high temperature plasma raw material.

A half of each rotating element is received in a metallic block having a semicircular recess with a predetermined gap. The liquid high temperature plasma raw material is supplied to the gap by a liquid conveying unit such as a pump. In this manner, the liquid high temperature plasma raw material is applied onto each of the rotating elements. The liquid high temperature plasma raw material is applied onto the rotating element with a substantially uniform thickness, which corresponds to the gap. The applied high temperature plasma raw material moves upon rotations of the rotating element such that the raw material is conveyed to the radiation position of the driver laser beam for plasma generation and the raw material is irradiated with the driver laser beam. As a result, the EUV radiation (light emission) takes place.

In this raw material supplying method, the feeding of the high temperature plasma raw material is continuous, unlike the dispersed (discontinued) target used in the droplet method. Thus, stable feeding of the high temperature plasma raw material is realized. However, scattering of the high temperature plasma raw material (tin) upon radiation of the driver laser beam for plasma generation and scattering of its ion occur in the same manner as the above-described high temperature plasma raw material supplying methods.

In other words, none of the above-described methods can avoid the generation of the debris. In general, therefore, a debris regulation device, which is disclosed in Patent Literature 4 (Japanese Patent Application Laid-Open No. 2007-5124), is provided to prevent the debris from arriving at the downstream optical system and the scanner (optical system for testing a mask if the mask testing device should be protected from the debris: Patent Literature 7 or Japanese Patent Application Laid-Open Publication No. 2012-235043). Debris regulation devices which are proposed to date cannot completely remove (eliminate) the generated debris. There is a demand for a method of further reducing an amount of debris to be generated.

A semiconductor manufacturing process, which is a primary process carried out with the EUV generation device, requires approximately 100 W or more of EUV output. The above-described countermeasure to the debris is one of quite important issues in order to reduce the frequency of optical part exchange and stably operate the light source device.

In view of the problems related to the debris that is generated upon the feeding of the high temperature plasma raw material and the plasma generation, an object of the present invention is to provide an extreme ultraviolet light source device that can further reduce the generation of debris, stably supply the high temperature plasma raw material (tin) to the plasma generating region, and ensure stable light emission of EUV. In particular, the object of the present invention is to provide a device for supplying the high temperature plasma raw material that can be used with the LPP method.

Solution to the Problems

The inventors made studies and investigations to overcome the above-described problems, and arrived at an idea of disposing a cover-like structure around a rotating element to prevent the produced debris from scattering in the plasma generating space such that the scattered liquid plasma raw material is trapped on the inner surface of the cover and guided to a first reserving vessel below the cover-like structure. The inventors also arrived at an idea of circulating the liquid material, which is received in the first reserving vessel, to utilize it again for the EUV generation. The inventors also arrived at an idea of attaching to the rotating element a mechanism for reforming a rotating element surface to improve the contact property, i.e., wettability, between the rotating element and the liquid plasma raw material for the purpose of reducing the scattering of the debris.

Specifically, the present invention provides the extreme ultraviolet light source devices in the following configurations.

(1) According to one aspect of the present invention, there is provided an extreme ultraviolet light source device that includes a disc-like rotating element (rotor), a rotation unit for causing the rotating element to rotate about a rotation center shaft, which is perpendicular to a flat portion of the rotating element, a cover-like structure (member) for surrounding (receiving) the rotating element with a gap, a first reserving vessel disposed in the cover-like structure for reserving (storing) a liquid high temperature plasma raw material, with part of the rotating element being immersed in the high temperature plasma raw material reserved in the first reserving vessel, a raw material supplying mechanism for applying the liquid high temperature plasma raw material onto at least part of a surface of the rotating element upon a rotating movement of the rotating element, and an energy beam providing device for irradiating the high temperature plasma raw material with an energy beam. The cover-like structure of the raw material supplying mechanism has an opening in (at) a certain part of the cover-like structure. The energy beam is directed to that surface of the rotating element, on which the high temperature plasma raw material is applied, through the opening of the cover-like structure. Extreme ultraviolet light generated upon irradiation of the energy beam is released from the opening of the cover-like structure. The cover-like structure has a scattering preventing member disposed to oppose a direction of a centrifugal force acting on the rotating element, which is caused to rotate by the rotation unit, and cover the rotating element.

(2) In another embodiment of the present invention, the gap between the rotating element and the cover-like structure may be decided (set) such that the liquid high temperature plasma raw material applied onto the rotating element has a predetermined film thickness.

(3) In still another embodiment of the present invention, a film thickness controlling mechanism may be provided in the cover-like structure. The film thickness controlling mechanism may face that surface of the rotating element, on which the high temperature plasma raw material is applied, with a predetermined clearance. The clearance may be decided (set) such that the liquid high temperature plasma raw material applied on the rotating element has a predetermined film thickness. The film thickness controlling mechanism may be located at a position that enables the adjustment of the film thickness of the high temperature plasma raw material in that region of the rotating element which is irradiated with the energy beam.

(4) In yet another embodiment of the present invention, a film thickness controlling (regulating) mechanism, which includes a structure having a channel-like recess, may be provided in the cover-like structure. The recess of the structure may face the rotating element. The recess may have an opening, and two sides of the structure along opposite edges of the opening of the recess may extend in the circumferential direction of the rotating element. A clearance between the rotating element and a bottom of the recess of the structure, which faces the rotating element, may be set (decided) such that the liquid high temperature plasma raw material applied on the rotating element has a predetermined film thickness. The film thickness controlling mechanism having the above-described structure may be located at a position that can adjust the film thickness of the high temperature plasma raw material in that region of the rotating element which is irradiated with the energy beam. The structure may be biased by a resilient member (elastic body) in a direction against the surface of the rotating element such that the two sides of the structure along the opposite edges of the recess may contact the surface of the rotating element.

(5) In another embodiment of the present invention, the energy beam may be directed to one of the two surfaces of the disc-like rotating element, which are perpendicular to the rotation center shaft, from a direction of the normal line to the surface of the disc-like rotating element or from a direction crossing the direction of the normal line to the surface of the disc-like rotating element. An optical axis of the extreme ultraviolet light may be decided on the basis of a position where the high temperature plasma, which emits the extreme ultraviolet light, is generated and a position where an extreme ultraviolet light condensing mirror is mounted, or on the basis of the position where the high temperature plasma is generated and an optical system used to test a mask. The optical axis of the extreme ultraviolet light may be set such that the energy beam directed to the rotating element may not coincide with a direction of the energy beam reflected by the rotating element.

(6) In another embodiment of the present invention, the optical axis of the extreme ultraviolet light may coincide with the direction of the normal line to a plane perpendicular to the rotation center shaft of the disc-shaped rotating element, onto which the high temperature plasma raw material is applied.

(7) In another embodiment of the present invention, the extreme ultraviolet light source device may further include a cooling unit for cooling the liquid high temperature plasma raw material such that the liquid high temperature plasma raw material applied on the rotating element is transformed to a solid near a region where the rotating element is irradiated with the energy beam passing through the opening of the cover-like structure.

(8) In another embodiment of the present invention, the rotation center shaft of the rotating element may not be perpendicular to the direction of the normal line to the liquid surface of the liquid high temperature plasma raw material reserved in the first reserving vessel, but may cross the direction of the normal line to the liquid surface of the liquid high temperature plasma raw material reserved in the first reserving vessel.

(9) In another embodiment of the present invention, a groove, a recess or a through hole may be formed in at least one of two faces of the disc-like rotating element which is irradiated with the energy beam. The two faces of the rotating element are perpendicular to the rotation center shaft of the rotating element.

(10) In another embodiment of the present invention, a surface texturing process may be applied on at least one of two faces of the disc-like rotating element in a region irradiated with the energy beam. The two faces of the rotating element are perpendicular to the rotation center shaft of the rotating element.

(11) In another embodiment of the present invention, a mechanism for applying a surface reforming process with plasma may be provided. This mechanism applies the surface reforming process to at least one of two faces of the disc-like rotating element in a region irradiated with the energy beam. The two faces of the rotating element are perpendicular to the rotation center shaft of the rotating element.

(12) In another embodiment of the present invention, an electrode may be provided such that the electrode faces at least one of two faces of the disc-like rotating element in a region irradiated with the energy beam. The two faces of the rotating element are perpendicular to the rotation center shaft of the rotating element. Also, a power source device may be provided for applying a voltage across the electrode and the rotating element.

(13) In another embodiment of the present invention, the extreme ultraviolet light source device may further include a liquid raw material circulating device. The liquid raw material circulating device may include a second reserving vessel configured to reserve (store) the high temperature plasma raw material, a raw material inflow conduit connected between the second reserving vessel and the first reserving vessel and configured to allow the high temperature plasma raw material to flow in the first reserving vessel from the second reserving vessel, a raw material outflow conduit connected between the second reserving vessel and the first reserving vessel and configured to allow the high temperature plasma raw material to flow in the second reserving vessel from the first reserving vessel, and a raw material drive unit configured to convey the high temperature plasma raw material to the first reserving vessel from the second reserving vessel.

(14) In another embodiment of the present invention, the second reserving vessel of the liquid raw material circulating device may be located such that the liquid surface of the liquid high temperature plasma raw material reserved in the second reserving vessel is lower than the liquid surface of the liquid high temperature plasma raw material reserved in the first reserving vessel when viewed in the gravity direction.

(15) In another embodiment of the present invention, the energy beam directed to that surface of the rotating element onto which the high temperature plasma raw material is applied may be a laser beam.

(16) In another embodiment of the present invention, the energy beam directed to that surface of the rotating element onto which the high temperature plasma raw material is applied may include two laser beams.

Advantageous Effects of the Invention

The LPP type extreme ultraviolet light source device of the present invention has the following advantages.

(1) The raw material supplying mechanism of the LPP type extreme ultraviolet light source device of the present invention applies the liquid high temperature plasma raw material on the rotating element in the form of thin film, and the rotating element except for the region to be irradiated with the energy beam is surrounded by the cover-like structure. Thus, it is possible to suppress the scattering of the liquid high temperature plasma raw material from the rotating element.

(2) When the opening is formed in a certain part of the cover-like structure to expose at least the planar surface of the rotating element (i.e., the surface perpendicular to the rotation shaft of the rotating element, or the side face of the rotating element), on which the high temperature plasma raw material is applied, then the debris generated upon irradiation of the energy beam is not released out of the cover-like structure unless the debris passes through the opening. Therefore, it is possible to reduce an amount of the debris released to the high temperature plasma generating space that emits the EUV light, as compared to conventional configurations.

(3) When part of the rotating element is immersed in the high temperature plasma raw material, which is reserved in the first reserving vessel, and the liquid high temperature plasma raw material is applied onto at least a certain part of the surface of the rotating element upon a rotating movement of the rotating element, then the high temperature plasma raw material is stably supplemented to that region of the rotating element which is irradiated with the energy beam while the high temperature plasma raw material being consumed upon the irradiation of the energy beam. Thus, it is possible to obtain stable EUV radiation (stable EUV light emission).

(4) When the gap between the rotating element and the cover-like structure is decided such that the liquid high temperature plasma raw material applied onto the rotating element has a predetermined film thickness, then the liquid high temperature plasma raw material applied on part of the side face of the rotating element can have a desired film thickness that is suitable for EUV radiation to be obtained upon irradiation of the energy beam.

(5) When the film thickness controlling mechanism is provided such that the liquid high temperature plasma raw material applied on the rotating element has a predetermined film thickness, then the liquid high temperature plasma raw material applied on part of the side face of the rotating element can have a desired film thickness that is suitable for EUV radiation to be obtained upon irradiation of the energy beam.

(6) In particular, when the film thickness controlling mechanism includes a channel-like structure having a recess, the recess of the channel-like structure faces the rotating element, and the channel-like structure is biased by the elastic body such that the channel-like structure is forced to contact the rotating element, then the film thickness controlling mechanism follows the movement of the rotating element even if the rotating element shakes and moves while the rotating element is rotating, and it is ensured that the liquid high temperature plasma raw material applied on part of the side face of the rotating element can have a desired film thickness that is suitable for EUV radiation to be obtained upon irradiation of the energy beam.

(7) When one of the two planar surfaces of the rotating element, on which the high temperature plasma raw material is applied, is irradiated with the energy beam, and the optical axis of the extreme ultraviolet light does not coincide with the proceeding direction of the energy beam reflected by the rotating element, then there is an advantage that it is possible to prevent undesired direct light of the energy beam (e.g., laser beam) from arriving at the downstream exposure device (scanner), and only allow necessary EUV radiation (light) to arrive at the scanner. If the extreme ultraviolet light source is used as a light source for the mask testing, it is possible to prevent the undesired direct light of the energy beam (e.g., laser beam) from arriving at the downstream optical system for the mask testing, and only allow the necessary EUV radiation to arrive at the optical system for the mask testing.

(8) When the extreme ultraviolet light source device further includes a cooling unit for cooling the liquid high temperature plasma raw material such that the liquid high temperature plasma raw material applied on the rotating element is transformed to a solid in and/or near a region where the rotating element is irradiated with the energy beam passing through the opening of the cover-like structure, then it is possible to further reduce the scattering of the high temperature plasma raw material upon irradiation of the energy beam, and suppress the generation of the debris.

(9) When the rotation center shaft of the rotating element is not perpendicular to the direction of the normal line to the liquid surface of the liquid high temperature plasma raw material reserved in the first reserving vessel but crosses the direction of the normal line to the liquid surface of the liquid high temperature plasma raw material reserved in the first reserving vessel, then the liquid high temperature plasma raw material is applied to part of the surface of the rotating element in a more reliable manner, and the lifting up of the liquid high temperature plasma raw material by the rotation of the rotating element is further facilitated.

(10) The high temperature plasma raw material is applied onto the two faces (planar surfaces) of the rotating element. When the groove is formed in at least that face out of two faces of the disc-like rotating element which is irradiated with the energy beam, then the liquid high temperature plasma raw material is applied and retained in the groove. Thus, it is possible to convey the liquid high temperature plasma raw material to a region to be irradiated with the energy beam in a reliable manner upon the rotation of the rotating element.

(11) The high temperature plasma raw material is applied onto the two faces (planar surfaces) of the rotating element. When the surface texturing process or a surface reforming (modification) treatment with plasma is applied on at least one of the two faces of the rotating element in a region irradiated with the energy beam, then the wettability of the rotating element, which is made from a high melting point metal such as molybdenum, to the liquid high temperature plasma raw material such as tin is improved. Thus, the surface of the rotating element has a better contact with the liquid high temperature plasma raw material, and the liquid raw material is applied onto the rotating element in a more reliable manner.

(12) When the extreme ultraviolet light source device further includes the liquid raw material circulating device, and the liquid raw material circulating device has the second reserving vessel configured to reserve the high temperature plasma raw material, the raw material inflow conduit, the raw material outflow conduit, and the raw material drive unit configured to convey the high temperature plasma raw material to the first reserving vessel from the second reserving vessel, then the high temperature plasma raw material is circulated between the first reserving vessel and the second reserving vessel, which has a larger capacity than the first reserving vessel, and the high temperature plasma raw material to be stored in the first reserving vessel can have a constant (predetermined) volume for a long time. As a result, it is possible to stably perform the EUV radiation for a long time. If the high temperature plasma raw material is circulated for reuse, then it is possible to reduce the consumption of the liquid high temperature plasma raw material.

(13) The high temperature plasma raw material in the first reserving vessel is heated by the rotating element as the rotating element is heated upon irradiation of the energy beam. Then, the wettability of the rotating element to the high temperature plasma raw material may change, and the contact condition of the high temperature plasma raw material with the rotating element may also change. As a result, the output of the EUV radiation may change. However, when the high temperature plasma raw material is circulated between the first reserving vessel and the second reserving vessel, which has a larger capacity than the first reserving vessel, the temperature of the high temperature plasma raw material does not change very much. Therefore, it is possible to provide EUV radiation having a stable output.

(14) When the second reserving vessel of the liquid raw material circulating device is located such that the liquid surface of the liquid high temperature plasma raw material reserved in the second reserving vessel is lower than the liquid surface of the liquid high temperature plasma raw material reserved in the first reserving vessel when viewed in the gravity direction, then the liquid high temperature plasma raw material does not flow in the first reserving vessel from the second reserving vessel even if the liquid raw material circulating device fails. Accordingly, a problem that the high temperature plasma raw material flows into the chamber through the opening of the first reserving vessel does not occur.

(15) In addition, when the above-described configuration is employed, the liquid high temperature plasma raw material itself serves as a thermal medium to receive a radiant heat from the plasma generated upon irradiation of the laser beam. Therefore, an advantage arises, i.e., the high temperature plasma raw material cools the rotating element and the surrounding atmosphere.

(16) It should be noted that when the above-described configuration is employed, a usable solid angle becomes an approximately half ($2\pi$sr), as compared to the conventional droplet method and a method of irradiating the radially outer surface of the rotating element with the energy beam. However, this is still adequately practical, when an advantage of reducing the debris to be generated is taken into account.

The above-described objects, aspects and advantages of the present invention and other objects, aspects and advantages of the present invention will be understood by a skilled person from the following "mode for carrying out the invention" (detailed description of the present invention) when the accompanying drawings and the claims are referred to.

MODE FOR CARRYING OUT THE INVENTION

Figure 1A:
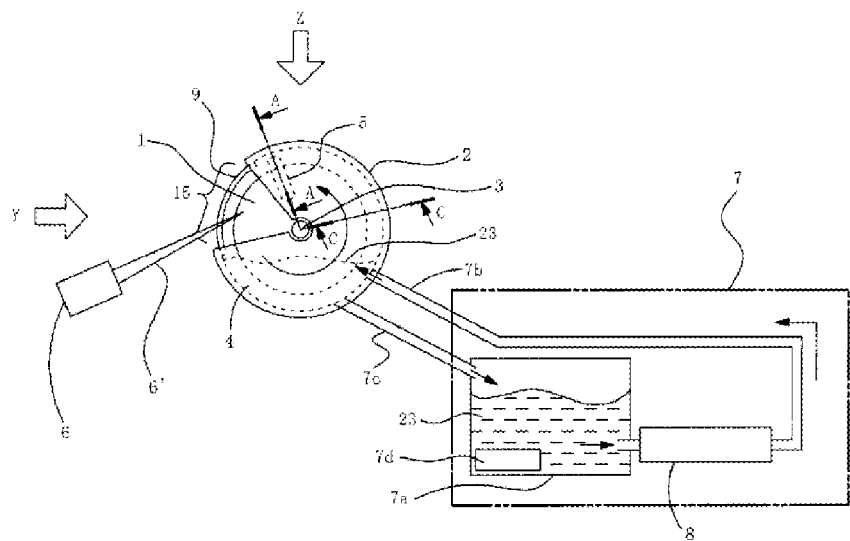
FIG. 1A illustrates a structure of an LPP type extreme ultraviolet (EUV) light source device according to an embodiment of the present invention.
Figure 1B:
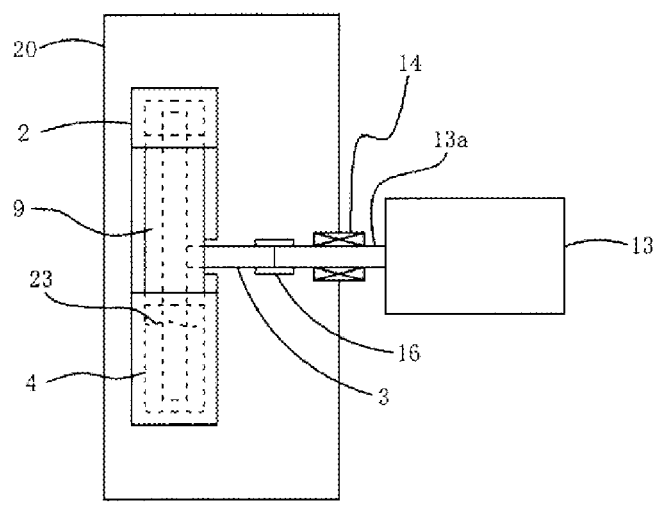
FIG. 1B illustrates the extreme ultraviolet light source device of FIG. 1A when viewed in the direction of the arrow Y.

FIGS. 1A and 1B show major components of an LPP type extreme ultraviolet light source device (hereinafter, referred to as "EUV light source device") according to an embodiment of the present invention. Those portions which are indicated by the broken line are components disposed inside a cover-like structure, and cannot be seen from outside. It should also be noted that FIGS. 1A and 1B are schematic views which are prepared for the sake of description. Actual size relation between the components shown in FIGS. 1A and 1B is not exactly the same as that shown in FIGS. 1A and 1B.

General Description of Raw Material Supplying Mechanism

Structures and operations of the respective parts of a raw material supplying mechanism of an EUV light source device of this embodiment will now be described below.

FIGS. 1A and 1B show the raw material supplying mechanism in the LPP type EUV light source device according to the embodiment of the present invention. FIG. 1A illustrates a rotating element 1 disposed in the raw material supplying mechanism, when viewed in the direction of a rotation center shaft 3 of the rotating element 1, together with a liquid raw material circulating device 7. FIG. 1B illustrates the rotating element 1 and a motor 13 for causing the rotating element to rotate when viewed in a direction perpendicular to the rotation center shaft 3.

As shown in FIG. 1B, the raw material supplying mechanism is disposed inside a chamber 20, i.e., a plasma generating container. The interior of the chamber 20 is maintained in a vacuum condition.

Major components of the raw material supplying mechanism are the rotating element 1, a cover-like structure 2, a first reserving vessel 4, and the liquid raw material circulating device 7.

The rotating element 1 rotates about the rotation center shaft 3, and part of the rotating element is immersed in the first reserving vessel 4 (inside the cover-like structure 2), which reserves a liquid high temperature plasma raw material 23. The rotating element 1 is made from a metal having a high melting point such as tungsten, molybdenum or tantalum.

Referring now to FIG. 1B, the rotation center shaft 3 of the rotating element 1 is coupled to a rotation shaft 13a of a motor 13 via a coupling 16. Thus, the rotating element 1 rotates as the rotation shaft 13a of the motor 13 rotates. The rotation center shaft 3 or the rotation shaft 13a of the motor 13 extends into the chamber 20, for example, via a mechanical seal 14. The mechanical seal 14 allows the rotation center shaft 3 or the rotation shaft 13a of the motor 13 to rotate while maintaining the reduced pressure atmosphere inside the chamber 20. FIG. 1B shows an example when the rotation shaft 13a of the motor 13 extends into the chamber 20 via the mechanical seal 14.

The rotating element 1 is surrounded by or received in the cover-like structure 2 except for a region to be irradiated with an energy beam 6' from an energy beam supplying device 6. In other words, the cover-like structure 2 has an opening 15 that corresponds to a passing region of the energy beam 6'.

The cover-like structure 2 is configured such that a lower part of the cover-like structure function as a first reserving vessel 4 for reserving the liquid high temperature plasma raw material 23. Specifically, the liquid high temperature plasma raw material 23 is introduced into the cover-like structure 2. It should be noted that the cover-like structure 2 may not function as the first reserving vessel 4, i.e., a separate first reserving vessel 4 may be disposed inside the cover-like structure 2.

As the rotating element 1 rotates about the rotation center shaft 3, the liquid high temperature plasma raw material 23 is pulled up and conveyed from the first reserving vessel 4 along the surface of the rotating element because of the wettability between the surface of the rotating element 1 and the liquid high temperature plasma raw material 23. There is a gap between the cover-like structure 2 and the rotating element 1 such that the rotating element 1 can rotate without interference.

Film Thickness Controlling Mechanism

The liquid high temperature plasma raw material 23 applied onto part of the surface of the rotating element 1 in the form of thin film in the above-described manner is guided to a film thickness controlling mechanism 5 disposed in the cover-like structure 2 upon rotation of the rotating element 1.

The film thickness controlling mechanism 5 is located to have a predetermined clearance between the rotating element 1 and the film thickness controlling mechanism 5. The film thickness controlling mechanism 5 is located at a position that can adjust the film thickness of the high temperature plasma raw material 23 in that region of the rotating element 1 which is to be irradiated with the energy beam 6'.

This predetermined clearance corresponds to the desired film thickness of the high temperature plasma raw material 23 applied onto the rotating element 1. Therefore, the liquid high temperature plasma raw material 23 applied onto the rotating element 1 is controlled such that the film thickness of the high temperature plasma raw material 23 on the rotating element 1 has the desired film thickness as the high temperature plasma raw material 23 passes through the film thickness controlling mechanism 5.

The liquid high temperature plasma raw material 23 having the controlled film thickness on the rotating element 1 is conveyed to the opening 15 of the cover-like structure 2 (i.e., the region to be irradiated with the energy beam 6') upon the rotation of the rotating element 1. In other words, the rotating element 1 rotates such that the liquid high temperature plasma raw material 23 on the rotating element 1 passes through the film thickness controlling mechanism 5 and then the high temperature plasma raw material 23 is conveyed to the region to be irradiated with the energy beam 6', as indicated by the arrow in FIG. 1A.

One example of the film thickness controlling mechanism 5 will be described with reference to FIGS. 2A, 2B and FIGS. 3A to 3C. The LPP type extreme ultraviolet (EUV) light source device in this embodiment does not utilize the liquid high temperature plasma raw material 23 applied on an outer edge face (circumferential portion) in a radial direction of the rotating element 1 for EUV radiation as disclosed in Patent Literature 1 (Japanese Patent Application Laid-Open Publication No. 2007-505460) or Patent Literature 3 (PCT International Publication No. 2009/077943). Rather, the LPP type extreme ultraviolet light source device in this embodiment utilizes the liquid high temperature plasma raw material 23 applied on a side face of the rotating element 1 (plane perpendicular to the rotation center shaft of the rotating element 1, which may be referred to as "planar surface" hereinafter).

The film thickness controlling device 5 is configured to form (shape) the liquid high temperature plasma raw material 23 in the thin film, which is applied onto part of the side face of the rotating element 1, such that the liquid high temperature plasma raw material has a predetermined film thickness that is suitable for EUV radiation.

Figure 2A:
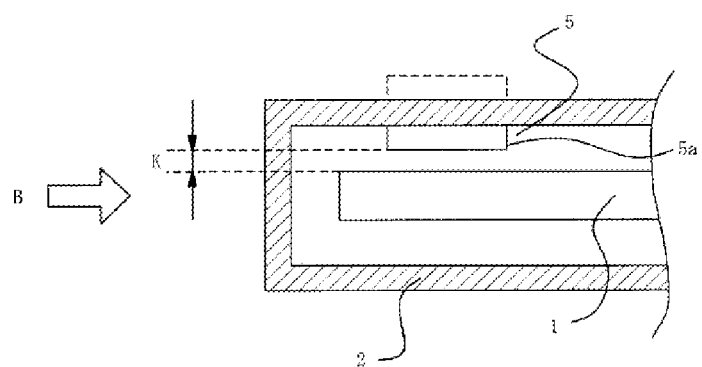
FIG. 2A is a conceptual view of a film thickness controlling device, and shows an enlarged cross-sectional view taken along the line A-A in FIG. 1A.

FIG. 2A shows an exemplary configuration of the film thickness controlling mechanism. FIG. 2A is a cross-sectional view taken along the line A-A in FIG. 1A. The structure that constitutes the film thickness controlling mechanism 5 shown in FIG. 2A is a block-like structure 5a mounted on an inner wall of the cover-like structure 2. The block-like structure 5a serves as a scraper to scrape part of the liquid high temperature plasma raw material 23 applied on part of the side face (planar surface) of the rotating element 1.

The clearance between the rotating element 1 and that surface of the structure 5a of the film thickness controlling mechanism 5, which faces the rotating element 1, is set to K. The clearance K is decided such that the liquid high temperature plasma raw material 23 applied on part of the side face of the rotating element 1 has a predetermined (desired) film thickness that is suitable for EUV radiation. In other words, the clearance K is equal to the above-mentioned predetermined film thickness.

The location of the film thickness controlling mechanism 5 is decided such that the film thickness control can be carried out in a region that encompasses that position on the rotating element 1 which is irradiated with the energy beam 6'.

The thickness of the film thickness controlling mechanism 5 itself may be greater than the thickness of the cover-shaped structure 2. In such configuration, the film thickness controlling mechanism 5 may protrude from the cover-shaped structure 2, as indicated by the broken line in FIG. 2A.

Figure 2B:
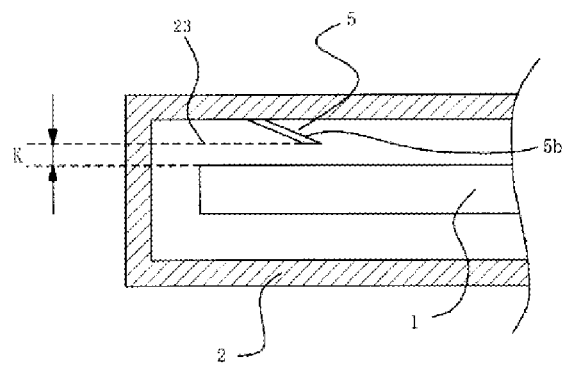
FIG. 2B shows the film thickness controlling device of FIG. 2A when viewed in the direction of the arrow B.

FIG. 2B shows another configuration of the film thickness controlling mechanism 5 that includes a plate-like structure 5b, instead of the block-like structure. FIG. 2B is a drawing when viewed in the direction of the arrow B in FIG. 2A.

Specifically, the film thickness controlling mechanism 5 includes the plate-like structure 5b and is disposed such that the plate-like structure 5b inclines relative to the surface of the rotating element 1. This configuration can also achieve the same function as the block-shaped film thickness controlling mechanism 5. It should be noted that that end of the plate-shaped structure 5b which faces the surface of the rotating element 1 may have a knife edge shape, if necessary.

Figure 3A:
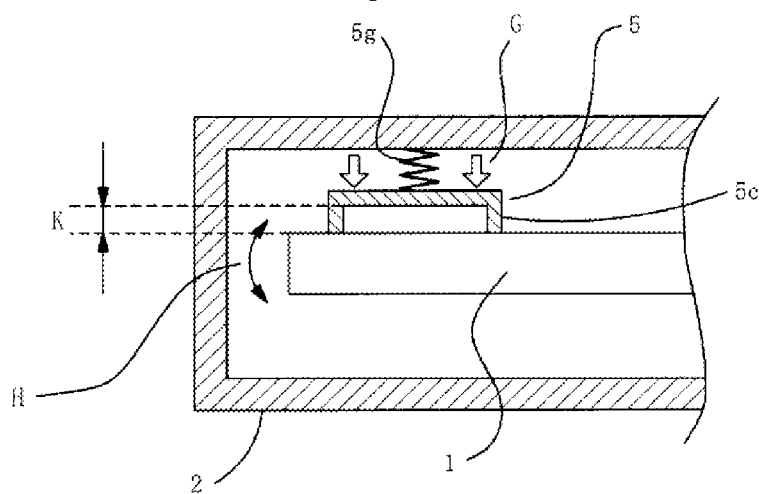
FIG. 3A is another conceptual view of the film thickness controlling device, and shows an enlarged cross-sectional view taken along the line A-A in FIG. 1A.
Figure 3B:
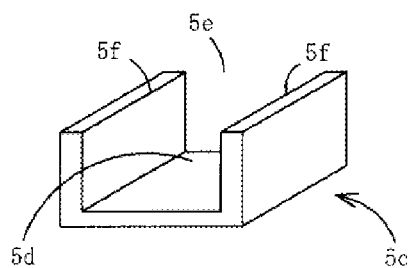
FIG. 3B is a perspective view of a structure having a recess that is shown in FIG. 3A.

FIG. 3A shows another configuration of the film thickness controlling mechanism 5. FIG. 3A is a cross-sectional view taken along the line A-A in FIG. 1A. The film thickness controlling mechanism 5 shown in FIG. 3A includes a structure 5c having a channel-like recess. FIG. 3B is a perspective view of the structure 5c having the channel-like recess (concave portion) when looked at from the rotating element 1. As illustrated in FIG. 3B, the structure 5c has a channel-like (trough-like) concave portion or recess 5d. The recess 5d has an opening 5e, and both sides of the opening 5e are planar portions.

The structure 5c is placed on the rotating element such that the channel-like concave portion 5d faces the rotating element 1. Both sides of the structure 5c along opposite edges of the opening 5e of the concave portion 5d contact the surface of the rotating element 1, and the sides 5f along the opposite edges of the opening of the concave portion 5d extend along the circumferential direction of the rotating element 1 (i.e., extend perpendicularly to the radial direction of the rotating element 1). The structure 5c serves as a scraper to scrape part of the liquid high temperature plasma raw material 23, which is applied on part of the side face (planar surface) of the rotating element 1.

The clearance between the rotating element 1 and that inner surface of the structure 5c of the film thickness controlling mechanism 5 which faces the rotating element 1 (i.e., bottom of the channel-shaped recess 5d) is set to K. The clearance K is decided such that the liquid high temperature plasma raw material 23 applied on part of the side face of the rotating element 1 has a predetermined thickness that is suitable for EUV radiation. Thus, the clearance K is equal to the predetermined film thickness.

The structure 5c is biased by an elastic body (resilient member) 5g in a direction against the surface of the rotating element 1 (direction of the arrow G). Thus, even if the rotating element 1 shakes and moves in the direction of the arrow H while the rotating element 1 is rotating, the film thickness controlling mechanism 5 follows the movement of the rotating element 1, and works such that the film thickness of the liquid high temperature plasma raw material 23 applied on part of the side face of the rotating element 1 becomes equal to the clearance K.

Figure 3C:
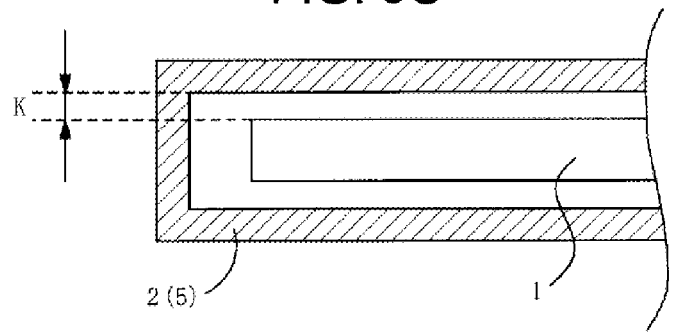
FIG. 3C is a conceptual view showing another structure of the film thickness controlling device, and shows an enlarged cross-sectional view taken along the line C-C in FIG. 1A without a film thickness controlling mechanism 5.

FIG. 3C depicts another configuration of the film thickness controlling mechanism. The film thickness controlling mechanism 5 shown in FIG. 3C is the cover-shaped structure 2 which additionally possesses the function of the film thickness controlling mechanism 5. FIG. 3C is a cross-sectional view taken along the line C-C in FIG. 1A, without the film thickness controlling mechanism 5.

Thus, the clearance between the side face of the rotating element 1 and that surface of the cover-like structure 2 which faces the side face (planar surface) of the rotating element 1 is set to K. The clearance K is decided such that the liquid high temperature plasma raw material 23 applied on part of the side face of the rotating element 1 has a predetermined film thickness that is suitable for EUV radiation. Thus, the clearance K is equal to the predetermined film thickness.

In any of the film thickness controlling mechanisms shown in FIGS. 2A, 2B, 3A, 3B and 3C, the liquid high temperature plasma raw material 23 applied on part of the side face (planar surface) of the rotating element 1 is scraped by the film thickness controlling mechanism 5 when the high temperature plasma raw material 23 passes through the film thickness controlling mechanism 5. As a result, the liquid high temperature plasma raw material 23 applied on part of the side face of the rotating element 1 is controlled to have the desired film thickness that is suitable for EUV radiation as the high temperature plasma raw material passes through the film thickness controlling mechanism 5.

Energy Beam

Referring back to FIGS. 1A and 1B, the cover-like structure 2 has the opening 15 that corresponds to the passage region for the energy beam 6', as described above. The liquid light source plasma raw material applied on the side face (planar surface) of the rotating element 1, which is exposed by the opening 15 of the cover-like structure 2, is irradiated with the energy beam 6' from the energy beam providing device 6. As a result, the plasma raw material is vaporized and generates the EUV radiation.

In recent years, a prepulse process is employed as disclosed in Patent Literature 5 (Japanese Patent Application Laid-Open Publication No. 2005-17274) and Patent Literature 6 (Japanese Patent Application Laid-Open Publication No. 2010-514214). The prepulse process irradiates a single raw material in an LPP type EUV light source device with a laser beam for a plurality of times. This approach firstly irradiates the high temperature plasma raw material 23 with a first energy beam (prepulse such as a YAG laser beam) to generate a weak plasma, thereby reducing the density of the high temperature plasma raw material 23. Then, this approach irradiates the weak plasma with a second energy beam (main pulse such as a $CO_2$ laser beam).

By reducing the density of the raw material with the prepulse, the absorption of the main pulse ($CO_2$ laser beam) into the raw material is improved, and the EUV radiation intensity is enhanced. Also, the plasma has a relatively small density, and the recapturing (reabsorption) of the EUV radiation decreases. Thus, the EUV generation efficiency is improved, and the debris generation is decreased.

As such, it is preferred that the energy beam directed to the liquid light source plasma raw material includes at least two laser beams, as described above. A device for emitting the energy beam (for irradiating the plasma raw material with the energy beam) may be, for example, a $CO_2$ gas laser source, a solid laser source such as a YAG laser source, or an excimer laser source such as an ArF laser, a KrF laser or a XeCl laser.

In this embodiment, the laser beam is used as the energy beam to be directed to the high temperature plasma raw material. It should be noted, however, that an ion beam or an electron beam may be directed, instead of the laser beam, to the liquid high temperature plasma raw material (tin) applied on the side face (planar surface) of the rotating element.

The energy beam (e.g., laser beam) is directed in a direction toward the side face (planar surface) of the rotating element. The high temperature plasma is generated at that position on one side face (planar surface) of the rotating element, which is irradiated with the laser beam. The plasma radiates the EUV light in the direction of a solid angle of $2\pi$sr.

Figure 4:
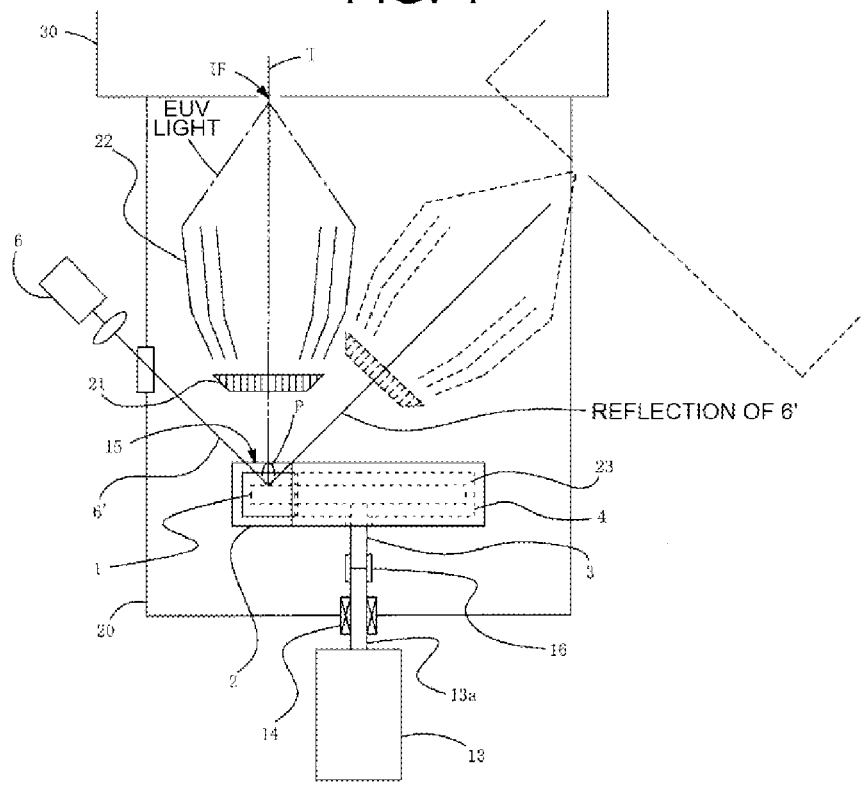
FIG. 4 is a view useful to describe relation between an optical axis of the EUV light and a proceeding direction of an energy beam, when viewed in the direction of the arrow Z in FIG. 1A.

FIG. 4 is a view useful to describe the relation between the optical axis of the EUV light and the proceeding direction of the energy beam. The same reference numerals are assigned to the same components and elements in FIGS. 1A, 1B and 4. The configuration shown in FIG. 4 includes the configuration shown in FIGS. 1A and 1B and further includes a foil trap 21 for capturing the debris generated from the high temperature plasma, an EUV light condensing mirror 22 for condensing the radiated EUV light to an intermediate condensing spot IF, and an exposure device 30.

In this embodiment, the EUV light condensing mirror 22 (oblique incident mirror) is disposed such that the optical axis T of the EUV light extends in the direction of the normal line to the side face of the rotating element 1, as shown in FIG. 4. Then, the center of the foil trap 21, the intermediate condensing point (IF) of the EUV light, and the exposure device 30 are aligned (arranged) on the optical axis T of the EUV light that extends in the direction of the normal line to the side face of the rotating element 1.

In such arrangement, the laser beam (energy beam 6') is directed to the surface of the rotating element 1 from (in) an oblique direction. In other words, the laser beam emitting direction is decided such that the reflecting direction of the laser beam by the rotating element 1 does not coincide with the optical axis T of the EUV light.

If the EUV light condensing mirror 22 is located as indicated by the broken line in FIG. 4 such that the reflecting direction of the laser beam by the rotating element 1 coincides with the optical axis T of the EUV light, then the laser beam (energy beam 6') that does not contribute to the generation of the high temperature plasma (i.e., EUV radiation) is introduced to the downstream exposure device 30 (scanner) in the chamber 20. This would raise a problem such as temperature elevation of the exposure device 30.

Figure 12:
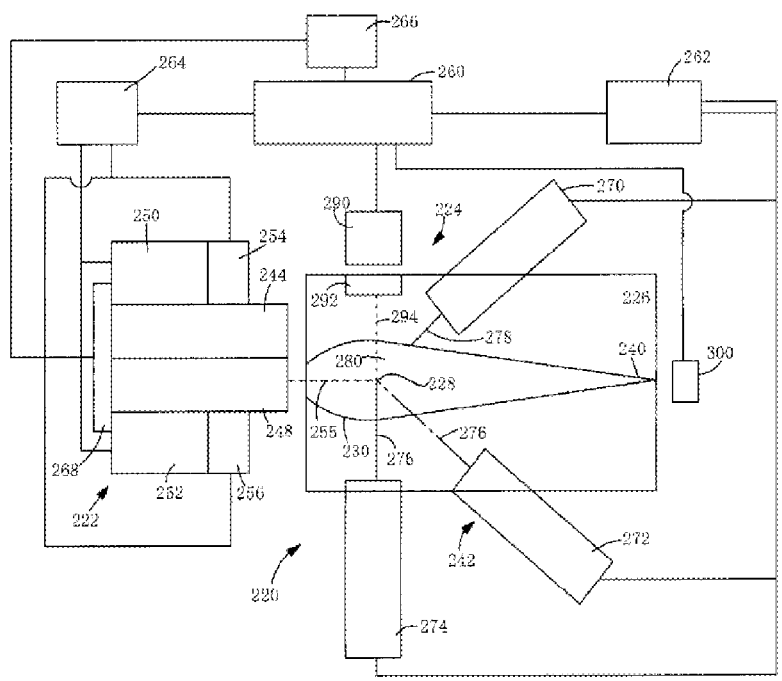
FIG. 12 shows a structure of a conventional LPP type extreme ultraviolet (EUV) light source device.

For example, when a conventional droplet type raw material supplying method shown in FIG. 12 is used, the energy beam is directed to the optical axis of the EUV radiation from behind the center portion of the EUV reflection mirror. Thus, similar to the above-described configuration, the energy beam that does not contribute to the EUV radiation is introduced to the downstream exposure device (scanner). In case of the light source for the mask testing, the energy beam is introduced to a downstream optical system for the mask testing.

As described above, the above-mentioned problem will be avoided if the laser emitting direction is decided such that the reflecting direction of the laser beam by the rotating element does not coincide with the optical axis of the EUV light.

In the above-described example, the EUV light source device is used as the light source for exposure. The optical axis of the EUV light is decided by the generating position of the high temperature plasma that emits the EUV light and the mounting position of the EUV light condensing mirror. In case of the light source for the mask testing, on the other hand, the optical axis of the EUV light is decided by the optical system for the mask testing and the generating position of the high temperature plasma that emits the EUV light, as disclosed in Patent Literature 7 (Japanese Patent Application No. 2012-235043).

It should be noted that although the optical axis of the EUV light extends in the direction of the normal line to the side face of the rotating element 1 in the above-described example, the present invention is not limited in this regard. Specifically, the optical axis T of the EUV light may not extend in the direction of the normal line to the side face of the rotating element 1. In either configuration, the above-described problem is overcome by arranging the laser beam emitting direction such that the reflecting direction of the laser beam by (from) the rotating element does not coincide with the optical axis of the EUV light.

Suppressing Scattering of High Temperature Plasma Raw Material (1)

Referring back to FIGS. 1A and 1B, the cover-shaped structure 2 that surrounds the rotating element 1 has the opening 15 that corresponds to the passage region of the energy beam 6', as described above. Thus, as the rotating element 1 having the high temperature plasma raw material 23 applied thereon rotates, part of the applied high temperature plasma raw material 23 may scatter from the opening 15 into the chamber 20. In order to suppress such scattering (splashing) of particles of the high temperature plasma raw material 23, a scattering preventing structure or member 9 is provided at the opening 15 of the rotating element 1.

The scattering preventing member 9 is a plate-like member and disposed at the opening 15 of the cover-like structure 2 such that the scattering preventing member 9 faces a circumferential face or edge (circular portion or a bending face) of the disc-like rotating element 1. The scattering preventing member 9 covers the rotating element and is directed opposite the direction of a centrifugal force acting on the rotating element, which is caused to rotate by the rotation unit. That face of the scattering preventing member 9 which faces the circumferential face of the rotating element 1 (hereinafter, occasionally referred to as "facing surface") is, for example, a bending surface.

Figure 5:
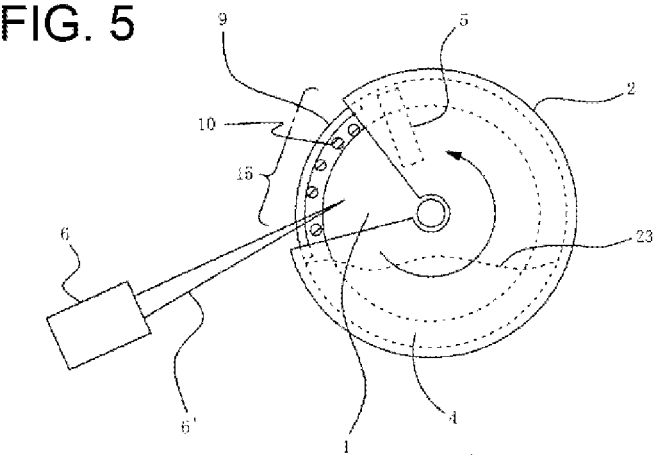
FIG. 5 is a view useful to describe recovery of flying particles of the high temperature plasma raw material in a first reserving vessel by a scattering prevention structure.

As shown in FIG. 5, the particles 10 of the high temperature plasma raw material 23 scattering or spreading in a direction of the centrifugal force upon the rotation of the rotating body 1 collide with the facing surface of the scattering preventing member 9. The spreading particles 10 that collide with the facing surface are reflected by the facing surface and/or adhere to the facing surface. Most of the reflected particles 10 moves into the cover-shaped structure 2, and returns to the first reserving vessel 4. Some of the particles 10 adhering onto the facing surface move downward along the facing surface in the gravity direction, and return to the first reserving vessel 4.

In this manner, the scattering preventing member 9 catches the spreading particles 10 flying from the rotating body 1, and causes part of the particles 10 to return to the first reserving vessel 4. Thus, the provision of the scattering preventing member 9 at the opening 15 of the cover-shaped structure 2 can suppress the spreading of part of the high temperature plasma raw material 23 into the chamber 20 from the opening 15. It should be noted that the scattering preventing member 9 does not hinder the travelling (proceeding) of the energy beam 6' that is directed to the side face of the rotating body 1 because the scattering preventing member 9 faces the circumferential portion (bending face) of the disc-shaped rotating element 1.

Suppressing Scattering of High Temperature Plasma Raw Material (2)

Figure 6A:
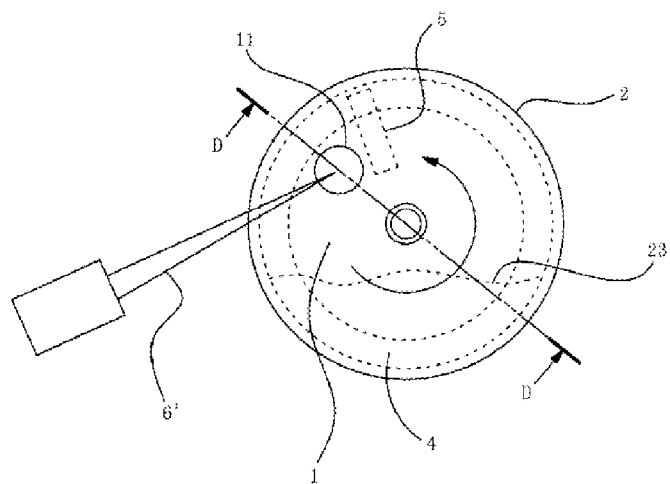
FIG. 6A is a view useful to describe an exemplary cover-like structure that has an opening at a position facing a side face (flat surface) of a rotating element.
Figure 6B:
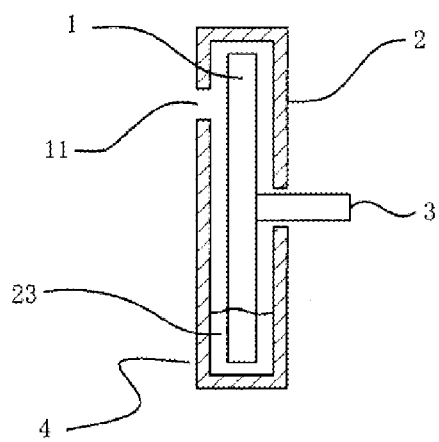
FIG. 6B is a cross-sectional view of the cover-like structure of FIG. 6A, taken along the line D-D.

FIGS. 6A and 6B show another embodiment of the structure for preventing the scattering. FIG. 6A illustrates the side face (planar surface) of the cover-like structure 2 having the scattering prevention structure. FIG. 6B is a cross-sectional view taken along the line D-D in FIG. 6A.

In the configuration shown in FIGS. 1A and 1B, the opening 15 formed in the cover-like structure 2 that surrounds the rotating element 1 exposes part of the two side faces (two planar surfaces) of the rotating element 1 and part of the circumferential portion (bending surface). The scattering prevention structure 9 is disposed at the opening 15 of the cover-like structure 2 such that the scattering prevention structure 9 faces the circumferential face (bending surface) of the rotating element 1.

In the configuration shown in FIGS. 6A and 6B, an opening 11 is formed in the cover-like structure 2 that surrounds the rotating element 1 such that the opening 11 is positioned to expose part of one of the two side faces (planar surface) of the rotating element 1. Part of the cover-like structure 2 serves as the scattering preventing member 9 shown in FIG. 1A. That part of the side face of the rotating element 1, which is exposed by the opening 11, is irradiated with the energy beam 6' and this part is a region where the EUV light is generated (EUV light emission takes place) as the high temperature plasma raw material 23 is irradiated with the energy beam 6'. Thus, the opening 11 is provided not to block or obstruct the travelling of the energy beam 6' and the generated EUV light.

Having such configuration, the cover-like structure 2 surrounds the entire circumferential portion (bending surface) of the rotating element 1. Thus, the flying particles of the liquid high temperature plasma raw material 23 that spreads (scatters) from the rotating element 1 in the direction of the centrifugal force is completely captured by the cover-like structure 2, and part of the captured particles return to the first reserving vessel 4. The particles scattering from the rotating element 1 can only proceed into the chamber 20 through the opening 11. Thus, the configuration of this embodiment imparts the function of the scattering preventing member 9 of FIG. 1A to the cover-like structure 2. The exposed portion of the rotating element 1 is limited to the region, through which the energy beam 6' proceeds. Because the exposed portion of the rotating element 1 is smaller than the exposed portion shown in FIG. 1A, it is possible to significantly reduce the spreading particles from the rotating element 1 and the particles proceeding into the chamber 20, as compared to the configuration shown in FIG. 1A.

The scattering preventing member 9 shown in FIG. 1A collects (recovers) the high temperature plasma raw material 23 scattering in the direction of the centrifugal force of the rotating element 1, but cannot suppress the scattering of the debris produced upon irradiating one side face (planar surface) of the rotating element 1 with the energy beam 6'. The configuration shown in FIG. 6A, on the other hand, only allows the debris to proceed into the chamber 20 through the opening 11. Therefore, it is possible to suppress the diffusion (dispersion) of the debris by properly deciding the size of the opening 11.

Suppressing Scattering of High Temperature Plasma Raw Material (3)

It should be noted that if the scattering of the liquid high temperature plasma raw material 23 from the opening 11 should further be suppressed, the liquid high temperature plasma raw material 23 applied on the rotating element 1 may be cooled in a region, which is irradiated with the energy beam 6' passing through the opening 11, and its neighboring region such that the liquid high temperature plasma raw material 23 is solidified. This can further suppress the scattering of the high temperature plasma raw material 23 into the plasma space (chamber 20) from the opening 11. When the solid-phase high temperature plasma raw material 23 is irradiated with the energy beam 6' and the EUV light is emitted, the surface of the solid-phase high temperature plasma raw material 23 on the rotating element 1 deforms. However, when the solid-phase deformed region passes through the first reserving vessel 4 upon the rotation of the rotating element 1, this region is transformed to the liquid-phase again. Then, the liquid high temperature plasma raw material 23 is applied again on this surface. In this manner, the surface is regenerated.

A unit for cooling and solidifying the liquid high temperature plasma raw material 23 may be provided, for example, in the following manner. The film thickness controlling mechanism 5 may be disposed in the vicinity of the opening 11, and a cooler function or module (not shown) may be imparted to the film thickness controlling mechanism 5. Specifically, a cooling mechanism that uses a cooling water or the like may be disposed behind the film thickness controlling mechanism 5 in the rotating direction of the rotating element 1. Alternatively, a mechanism for spraying a noble gas (e.g., helium or argon) to the high temperature plasma raw material may be disposed behind the film thickness controlling mechanism 5. Such mechanism solidifies the liquid high temperature plasma raw material 23, with its film thickness being controlled.

Improving Application Property of High Temperature Plasma Raw Material (1)

Figure 7:
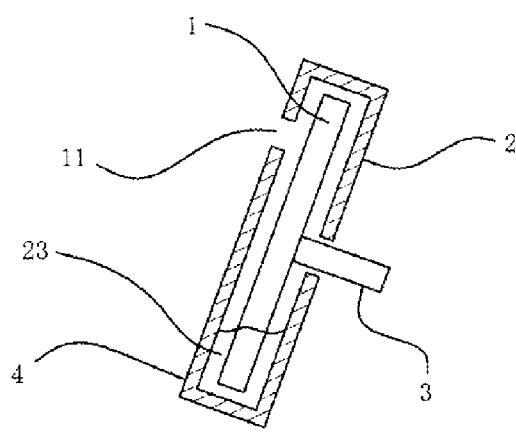
FIG. 7 illustrates a configuration of the rotating element that has a center rotating shaft inclined relative to the direction of a normal line to the liquid surface of the liquid high temperature plasma raw material.

In the examples shown in FIGS. 1A and 6A, the proceeding direction of part of the rotating element 1 into the liquid high temperature plasma raw material 23 is substantially perpendicular to the surface (liquid surface) of the liquid high temperature plasma raw material 23. However, the present invention is not limited in this regard. For example, as shown in FIG. 7, the rotating element 1 may be inclined relative to the liquid surface direction (gravity direction) of the high temperature plasma raw material 23, and the incident angle of the rotating element 1 to the liquid surface of the liquid high temperature plasma raw material 23 may become an oblique angle. Specifically, the rotation center shaft 3 of the rotating element 1 may be inclined relative to the direction of the normal line to the liquid surface of the high temperature plasma raw material 23 such that an amount of dripping (dropping) of the liquid high temperature plasma raw material 23 may be reduced, as compared to the examples shown in FIGS. 1A and 6A. This ensures that the liquid high temperature plasma raw material 23 is applied onto part of the surface of the rotating element 1 in a more reliable manner. Thus, it is possible to further facilitate the lifting up of the liquid high temperature plasma raw material 23 upon the rotation of the rotating element 1.

Improving Application Property of High Temperature Plasma Raw Material (2)

As described above, the high temperature plasma raw material 23 is applied onto the surface of the rotating element 1 as part of the rotating element 1 is immersed in the liquid high temperature plasma raw material 23 reserved in the first reserving vessel 4. The high temperature plasma raw material 23 is then conveyed to the region to be irradiated with the energy beam 6'. Thus, it is preferred that the liquid high temperature plasma raw material 23 has a good contact with the surface of the rotating element 1. In other words, it is preferred that the surface of the rotating element 1 has a good wettability to the liquid high temperature plasma raw material 23.

In general, however, the rotating element 1, which is made from a high melting point metal such as molybdenum, does not have a good contact property to the liquid high temperature plasma raw material 23.

In such case, a surface texturing process may be applied on the surface of the rotating element 1. By applying the surface texturing process to the surface of the rotating element 1, the surface of the rotating element 1 has an improved wettability to the liquid high temperature plasma raw material 23. Thus, the surface of the rotating element 1 has a better contact with the liquid high temperature plasma raw material 23, and the liquid raw material is applied onto the rotating element 1 in a more reliable manner.

Improving Application Property of High Temperature Plasma Raw Material (3)

Instead of applying the surface texturing process, there may be provided a mechanism for carrying out the surface reforming (modification) on the surface of the rotating element 1 with the plasma, which is generated upon discharge, irradiation of a laser beam, irradiation of an ion beam, irradiation of an electron beam or the like, in order to improve the application property of the rotating element 1.

For example, a substance (e.g., oxide) that adheres onto the surface of the rotating element 1 and can deteriorate the wettability of the liquid high temperature plasma material (tin) may be removed by the plasma of the discharging process (sputtering) or the like, in order to enhance the reactivity between the material of the rotating element 1 and tin (high temperature plasma raw material 23) and improve the surface tension of tin. This in turn causes the rotating element 1 to have a better wettability to tin.

Figure 8:
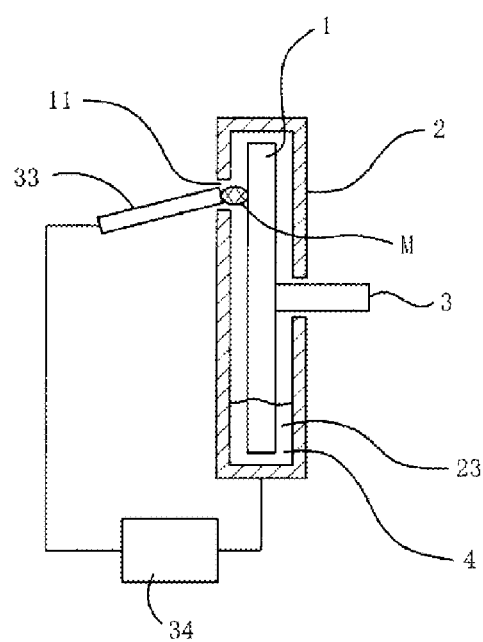
FIG. 8 illustrates a configuration that reforms a surface of the rotating element with the discharge plasma.

FIG. 8 shows a configuration that carries out the surface reforming to the surface of the rotating element 1 with the discharge M.

As illustrated in FIG. 8, an electrode 33 faces the surface of the rotating element 1 via the opening 11 formed in the cover-like structure 2. A power source device (e.g., high voltage pulse power source or a high voltage high frequency AC power source) 34 is then connected to the electrode 33 and the cover-like structure 2. The rotating element 1 is electrically connected to the power source device 34 via the high temperature plasma raw material 23 reserved in the cover-like structure 2 (i.e., in the first reserving vessel 4).

The discharge M is generated between the electrode 33 and the rotating element 1 by applying a high voltage across the electrode 33 and the rotating element 1 from the power source device 34. Thus, the surface of the rotating element 1 is exposed to the discharge M, and the oxide and other substances in that surface region of the rotating element 1 where the discharge M is generated are removed. Accordingly, it is possible to properly apply the liquid high temperature plasma raw material 23 in that region.

As described above, the electrode 33 faces the surface of the rotating element 1 through the opening 11 formed in the cover-like structure 2. Thus, that region on the rotating element 1 which is surface-reformed by the discharge M is a region to be irradiated with the energy beam 6' via the opening 11.

It goes without saying that the surface reforming to the surface of the rotating element 1 by the discharge M is performed before the rotating element 1 is irradiated with the energy beam 6'. As the rotating element 1 is caused to rotate during the discharge, that region of the rotating element 1 which is irradiated with the energy beam 6' is entirely surface-reformed. It is needless to say that the region of the rotating element 1, which is irradiated with the energy beam 6', is an annular region.

When the surface treatment with the discharge M finishes, the electrode 33 is retracted from the opening 11 of the cover-like structure 2 by a drive mechanism (not shown) such that the electrode 33 is moved to a position that does not obstruct (block) the radiating (travelling) path of the energy beam 6' to the rotating element 1.

It should be noted that a second opening may be formed in the cover-like structure 2, which is separate from the opening 11, and the electrode 33 may face the surface of the rotating element 1 through the second opening. In this configuration, the electrode 33 does not block the travelling of the energy beam 6' to the rotating element 1, and therefore it is not necessary to move the electrode 33 with the drive mechanism or the like.

The position of the second opening in the cover-like structure 2 is a position that faces the annular region of the rotating 1, which is irradiated with the energy beam 6'. This position of the second opening allows the provision (arrangement) of the electrode 33.

Improving Application Property of High Temperature Plasma Raw Material (4)

As described above, that region of the rotating element 1 which is irradiated with the energy beam 6' is the annular region. Thus, a groove 12 may be formed in the surface of the rotating element 1 such that the groove 12 corresponds to the annular region.

Figure 9A:
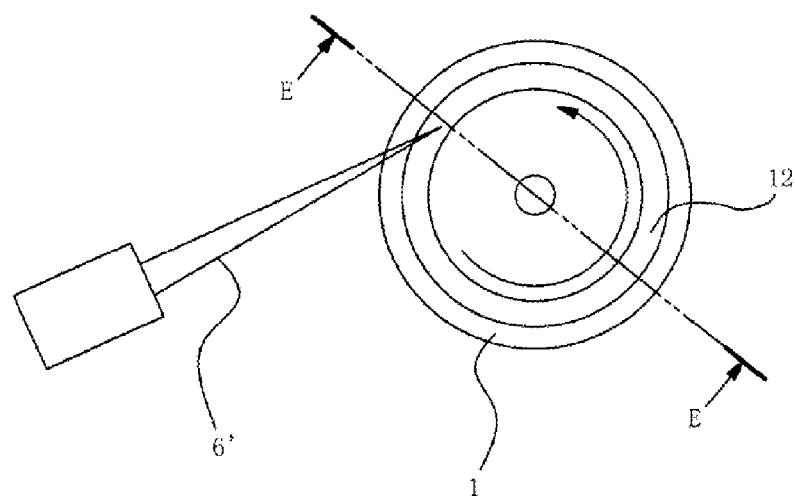
FIG. 9A illustrates an exemplary rotating element that has a groove in a surface of the rotating element.
Figure 9B:
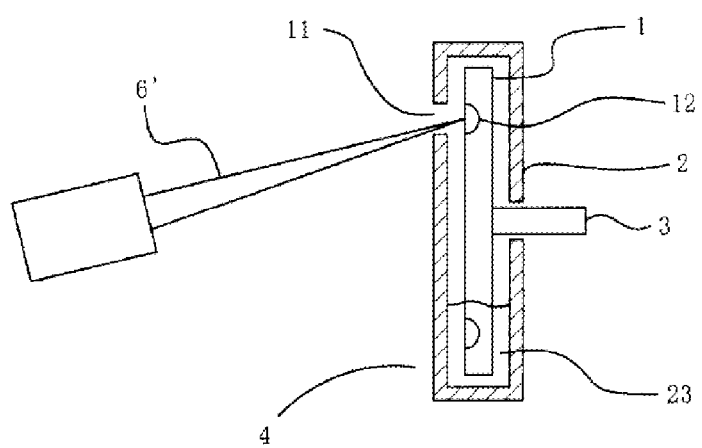
FIG. 9B is a cross-sectional view of the rotating element of FIG. 9A, taken along the line E-E, together with the cover-like structure.

FIGS. 9A and 9B show an embodiment that has an annular groove 12 in the surface of the rotating element.

FIG. 9A illustrates the rotating element 1 when viewed from the direction of the rotation center shaft 3 of the rotating element 1. FIG. 9B is a cross-sectional view taken along the line E-E in FIG. 9A. FIG. 9B also illustrates the cover-like structure 2.

As depicted in FIGS. 9A and 9B, the groove 12 is formed, in an annular shape, in the side face (planar surface) of the rotating element 1. Because the groove 12 is provided, the liquid high temperature plasma raw material 23 is applied such that the liquid high temperature plasma raw material 23 retains in the groove 12. Thus, it is possible to convey the liquid high temperature plasma raw material 23 to the region, which is irradiated with the energy beam 6', in a more reliable manner upon the rotation of the rotating element 1. It should be noted that the above-described surface texturing process or the surface treatment may be applied to the groove 12.

It should be noted that the groove does not necessarily extend coaxially and continuously as described above. For example, as shown in FIG. 10, the groove may be provided discretely (intermittently).

Figure 10:
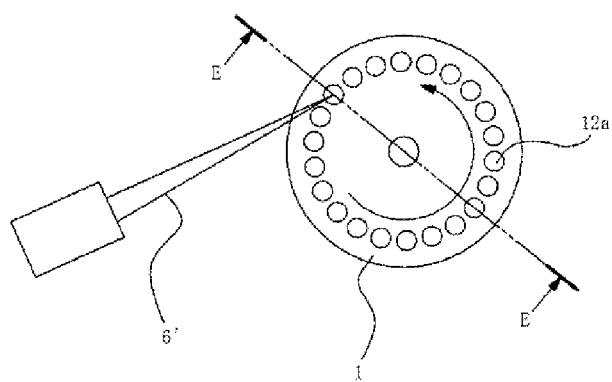
FIG. 10 is similar to FIG. 9A, and shows an exemplary rotating element that has a groove in a surface of the rotating element.
Figure 11:
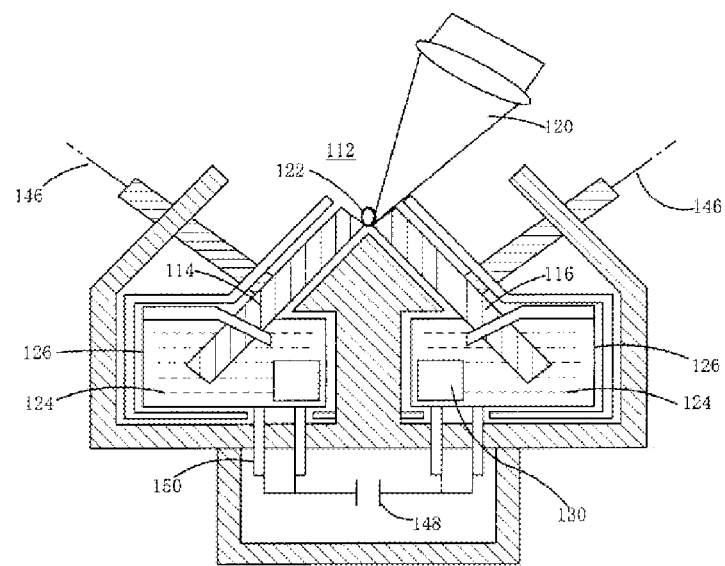
FIG. 11 shows a structure of a conventional LDP type extreme ultraviolet (EUV) light source device.

FIG. 10 depicts the side face (planar surface) of the rotating element 1. FIG. 10 shows a plurality of recesses 12a that are discretely and annularly disposed around the rotation center of the rotating element 1. Instead of the recesses 12a, there may be provided a plurality of through holes discretely and annularly around the rotation center of the rotating element 1. The through holes can also retain the liquid high temperature plasma raw material 23 therein because of the surface tension. Therefore, similar to the configuration having the groove or the like, it is possible to convey the high temperature plasma material to a region to be irradiated with the energy beam 6'.

Mechanism for Circulating High Temperature Plasma Raw Material

Referring back to FIG. 1A, that part of the liquid high temperature plasma raw material 23 applied on part of the rotating element 1, which is irradiated with the energy beam 6', is consumed. As the rotating element 1 rotates, that region of the rotating element 1 where said part of the high temperature plasma raw material 23 is consumed is returned to the first reserving vessel 4, and the high temperature plasma raw material 23 is supplemented to the region where said part of the high temperature plasma raw material 23 has been consumed such that the raw material is conveyed again upon the rotation of the rotating element 1. As such, the high temperature plasma raw material 23 is circulated to the region irradiated with the energy beam 6'.

On the other hand, the liquid high temperature plasma raw material 23 (tin) is circulated between the first reserving vessel 4 and the second reserving vessel 7a by the liquid raw material circulating device 7.

The liquid raw material circulating device 7 includes the second reserving vessel 7a for reserving (storing) the high temperature plasma raw material 23, raw material inflow and outflow conduits 7b and 7c for circulating the high temperature plasma raw material 23 between the first reserving vessel 4 and the second reserving vessel, and a raw material drive unit (pump) 8 for circulating the plasma material.

The raw material inflow conduit 7b is connected to the first reserving vessel 4 to introduce the high temperature plasma raw material 23 to the first reserving vessel 4 from the second reserving vessel 7a, and the raw material outflow conduit 7c is connected to the first reserving vessel 4 to allow the high temperature plasma raw material 23 to flow out of the first reserving vessel 4 and flow to the second reserving vessel 7a.

In order to stably perform the EUV radiation for a long time, it is preferred that a large amount of high temperature plasma raw material 23 is reserved in the first reserving vessel 4. However, when the size of the chamber 20 of the EUV light source device is considered, there is a limitation on the size of the first reserving vessel 4 mounted (supported) in the chamber 20. Thus, it is difficult to store a large amount of tin in the first reserving vessel 4.

To cope with this, this embodiment includes the second reserving vessel 7a outside the chamber 20. The second reserving vessel 7a is configured to reserve a large amount of high temperature plasma raw material 23 (e.g., liquid tin) therein. Thus, this embodiment can supplement the high temperature plasma raw material 23 to the first reserving vessel 4 via the raw material inflow conduit 7b. This configuration ensures that a constant (desired) amount of high temperature plasma raw material 23 is stored in the first reserving vessel 4 for a long time. As a result, it is possible to stably carry out the EUV radiation for a long time.

As described above, the raw material inflow conduit 7b for receiving the high temperature plasma raw material from the second reserving vessel 7a is connected to the first reserving vessel 4, and the raw material outflow conduit 7c for allowing the high temperature plasma raw material 23 to flow out of the first reserving vessel 4 toward the second reserving vessel 7a is also connected to the first reserving vessel 4. Thus, the high temperature plasma raw material 23 is circulated between the first reserving vessel 4 and the second reserving vessel 7a such that an amount of high temperature plasma raw material 23 in the first reserving vessel 4 becomes constant or a desired amount.

As the high temperature plasma raw material 23 applied on part of the rotating element 1 is irradiated with the energy beam 6', the high temperature plasma is produced and the EUV radiation takes place. At the same time, the rotating element 1 itself is heated. The heated rotating element 1 performs the heat exchange between the high temperature plasma raw material 23 and the rotating element every time the rotating element 1 passes through the interior of the first reserving vessel 4, which reserves the high temperature plasma raw material 23. Thus, if the high temperature plasma raw material 23 reserved in the first reserving vessel is not circulated, the temperature of the high temperature plasma raw material 23 in the first reserving vessel 4 changes. When the high temperature plasma raw material 23 is a liquid tin, the viscosity of the liquid tin changes with the temperature. Thus, the wettability of the rotating element 1 to the liquid tin also changes, and the contact condition of the liquid tin with the rotating element 1 also changes. Accordingly, there is a possibility that the output of the EUV radiation, which is generated when the high temperature plasma raw material 23 applied on part of the rotating element 1 is irradiated with the energy beam 6', may also change.

If the second reserving vessel 7a, which has a relatively large size, is disposed outside the chamber 20 of the EUV light source device, and the high temperature plasma raw material 23 is circulated between the first reserving vessel 4 and the second reserving vessel 7a, then a large(r) amount of high temperature plasma raw material 23 (liquid tin) can be stored in the second reserving vessel 7a, and therefore it is possible to make the heat capacity of the liquid tin large(r). As such, even if the liquid tin that has changed its temperature in the first reserving vessel 4 flows in the second reserving vessel 7a through the raw material outflow conduit 7c, the temperature of the liquid tin in the second reserving vessel 7a does not change very much, i.e., the temperature of the liquid tin in the second reserving vessel 7a is kept to a substantially fixed value. Because the liquid tin that has the substantially fixed temperature flows in the first reserving vessel 4 through the raw material inflow conduit, the temperature of the liquid tin in the first reserving vessel 4 is also kept to a substantially fixed value. Therefore, the adhesion (contact) of the liquid tin onto the rotating element 1 becomes stable, and the output of the EUV radiation also becomes stable.

The temperature of the high temperature plasma raw material 23 in the second reserving vessel 7a is adjusted (regulated) by a temperature adjusting mechanism 7d disposed in the second reserving vessel 7a. Because the second reserving vessel 7a is disposed outside the chamber 20, it is possible to use the temperature adjusting mechanism 7d having a large capacity, independent of the size of the chamber 20. Thus, it is possible to set the temperature of the high temperature plasma raw material 23 (liquid tin) to a predetermined temperature in a short time.

For example, when the high temperature plasma raw material 23 is the liquid tin, the above-mentioned predetermined temperature is a temperature that can maintain tin in the liquid phase. In other words, the temperature control is performed such that the tin, which is the high temperature plasma raw material 23, is maintained at a temperature equal to or higher than the melting point. It should be noted that an excessive temperature elevation of the high temperature plasma raw material 23 (liquid tin) accelerates the deterioration of the structure such as the first reserving vessel 4 and the second reserving vessel 7a. Therefore, the controlled temperature is preferably set to near the melting point of the high temperature plasma raw material 23 (tin).

It is preferred that that face of the liquid tin circulating device 7 which contacts the liquid material, that face of the first reserving vessel 4 which contacts the liquid material, that face of the raw material inflow conduit 7b which contacts the liquid material, that face of the raw material outflow conduit 7c which contacts the liquid material, and that face of the cover-like structure 2 which contacts the liquid material are coated with a ceramic material (e.g., TiN) respectively to prevent erosion, which would otherwise be caused by the liquid metal. Alternatively, it is preferred that that face of the liquid tin circulating device 7 which contacts the liquid material, that face of the first reserving vessel 4 which contacts the liquid material, that face of the raw material inflow conduit 7b which contacts the liquid material, that face of the raw material outflow conduit 7c which contacts the liquid material, and that face of the cover-like structure 2 which contacts the liquid material are made from a metal having a high melting point (e.g., tungsten, molybdenum, or tantalum) and/or its alloy.

The circulation of the high temperature plasma raw material 23 between the first reserving vessel 4 and the second reserving vessel 7a is performed by the raw material drive unit 8. The raw material drive unit 8 includes, for example, an electromagnetic pump to convey the liquid metal by means of a magnetic force.

Specifically, the liquid raw material circulating device 7 uses the electromagnetic force of the raw material drive unit 8, i.e., the electromagnetic pump, to convey the liquid tin, i.e., the high temperature plasma raw material 23, to the first reserving vessel 4 from the second reserving vessel 7a through the raw material inflow conduit 7b. Part of the high temperature plasma raw material 23 reserved in the first reserving vessel 4 is applied, in the form of thin film, onto part of the surface of the rotating element 1 upon rotation of the rotating element 1. Part of the applied high temperature plasma raw material 23 is excited by the pulse laser beam (i.e., the energy beam 6'). Accordingly, the high temperature plasma is generated, and the EUV radiation takes place. That region of the rotating element 1, in which the high temperature plasma raw material 23 is applied, includes a region irradiated with the energy beam 6' and returns to the first reserving vessel 4 again upon the rotation of the rotating element 1. Thus, the high temperature plasma raw material 23 is supplemented to the region where the high temperature plasma raw material 23 is consumed (disappears) upon irradiation of the energy beam 6'. It should be noted that the high temperature plasma raw material 23 reserved in the first reserving vessel 4 returns to the second reserving vessel 7a through the raw material outflow conduit 7c due to the gravity and the electromagnetic force. The temperature of the high temperature plasma raw material becomes the predetermined value in the second reserving vessel 7a, and the high temperature plasma raw material 23 is circulated again to the first reserving vessel 4.

If a certain abnormality occurs in the liquid raw material circulating device 7, and the circulation of the high temperature plasma raw material 23 between the first reserving vessel 4 and the second reserving vessel 7a stops, then there is a possibility that the high temperature plasma raw material 23 moves to the first reserving vessel 4 from the second reserving vessel 7a if the liquid surface of the liquid high temperature plasma raw material in the second reserving vessel 7a is higher than the liquid surface of the liquid high temperature plasma raw material in the first reserving vessel 4 when viewed in the gravity direction. As described above, the second reserving vessel 7a stores a larger amount of high temperature plasma raw material 23 than the first reserving vessel 4. Also, the cover-like structure 2 that serves as the first reserving vessel 4 has the opening 15, 11 to direct the energy beam 6' to the rotating element. Thus, if the high temperature plasma raw material 23 moves, there is a possibility that the high temperature plasma raw material 23 overflows the first reserving vessel 4, and the liquid high temperature plasma raw material 23 flows into the chamber 20, i.e., the plasma generating space.

Therefore, it is preferred that the first reserving vessel 4 and the second reserving vessel 7a are arranged such that the liquid surface of the liquid high temperature plasma raw material in the second reserving vessel 7a of the liquid raw material circulating device 7 is lower than the liquid surface of the liquid high temperature plasma raw material in the first reserving vessel 4 when viewed in the gravity direction.

The second reserving vessel 7a is a closed space. Thus, the second reserving vessel 7a receives and stores the surplus liquid high temperature plasma raw material 23, which flows in from the first reserving vessel 4, without leakage of the raw material 23 to the outside.

Although specific embodiments of the present invention are described in the foregoing, these embodiments are mere examples, and do not intend to limit the scope of the present invention. The device (apparatus) and the method described in the specification may be practiced in different forms and embodiments from the above-described embodiments. It is also possible to make omissions, substitutions, changes and/or modifications to the above-described embodiments, if necessary, without departing from the scope of the invention. Those embodiments which are obtained after the omissions, substitutions, changes and/or modifications are encompassed by the claims and their equivalents, i.e., such embodiments fall in the technical scope of the present invention.

This application is based on Japanese Patent Application No. 2013-95235 (filed on Apr. 30, 2013), and claims a priority from the above-identified Japanese Patent Application. The entire disclosure of the above-identified Japanese Patent Application is incorporated herein by reference.

REFERENCE NUMERALS AND SIGNS

1: Rotating element
2: Cover-like structure
3: Rotation center shaft
4: First reserving vessel
5: Film thickness controlling mechanism
5a: Block-like structure
5b: Plate-like structure
5c: Structure having a channel-like recess
5d: Channel-like recess
6: Energy supplying mechanism (laser radiation device)
6': Energy (laser) beam
7: Liquid raw material circulating device
7a: Second reserving vessel
8: Raw material drive (pump)
9: Scattering preventing structure
10: Flying particles
11: Opening
12: Groove
12a: Recess
13: Motor
13a: Motor rotation shaft
14: Mechanical seal
15: Opening
16: Coupling
20: Chamber
21: Foil trap
22: EUV light condensing mirror
23: High temperature plasma raw material
30: Exposure device
33: Electrode
34: Power supply device

The invention claimed is:
1. An extreme ultraviolet light source device comprising:
a disc-like rotating element;
a rotation unit configured to cause the rotating element to rotate about a rotation center shaft, which is perpendicular to a flat surface of the rotating element;
a cover-like structure configured to surround the rotating element with a gap;
a first reserving vessel disposed in the cover-like structure and configured to reserve a liquid high temperature plasma raw material, with part of the rotating element being immersed in the high temperature plasma raw material reserved in the first reserving vessel;
a raw material supplying mechanism configured to apply the liquid high temperature plasma raw material onto at least part of the flat surface of the rotating element upon a rotating movement of the rotating element;
an energy beam providing device configured to irradiate the high temperature plasma raw material with an energy beam; and
a film thickness controlling mechanism provided in the cover-like structure, the film thickness controlling mechanism including a U-shaped structure having a channel-like recess, the U-shaped structure being biased by an elastic body in a direction against the flat surface of the rotating element such that two opposite sides of the U-shaped structure contact the flat surface of the rotating element, a clearance between the rotat- ing element and a bottom of the recess of the structure, which faces the rotating element, being set such that the liquid high temperature plasma raw material applied on the rotating element has a predetermined film thickness, the cover-like structure of the raw material supplying mechanism having an opening in a certain part of the cover-like structure such that the energy beam is directed to the flat surface of the rotating element, on which the high temperature plasma raw material is applied, through the opening of the cover-like structure, and extreme ultraviolet light generated upon irradiation of the energy beam is released from the opening of the cover-like structure, the cover-like structure having a scattering preventing member disposed to oppose a direction of a centrifugal force acting on the rotating element, which is caused to rotate by the rotation unit, and cover the rotating element, wherein the energy beam is directed to one of two flat surfaces of the disc-like rotating element, which are perpendicular to the rotation center shaft, and an optical axis of the extreme ultraviolet light is decided based on a position where the high temperature plasma, which emits the extreme ultraviolet light, is generated and a position where an extreme ultraviolet light condensing mirror is mounted, or based on the position where the high temperature plasma is generated and an optical system used to test a mask, and the optical axis of the extreme ultraviolet light is set such that the energy beam directed to the rotating element do not coincide with a direction of the energy beam reflected by the rotating element.

2. The extreme ultraviolet light source device according to claim 1, wherein the optical axis of the extreme ultraviolet light coincides with a direction of a normal line to a plane perpendicular to the rotation center shaft of the disc-like rotating element, onto which the high temperature plasma raw material is applied.

3. An extreme ultraviolet light source device comprising:
a disc-like rotating element;
a rotation unit configured to cause the rotating element to rotate about a rotation center shaft, which is perpendicular to a flat surface of the rotating element;
a cover-like structure configured to surround the rotating element with a gap;
a first reserving vessel disposed in the cover-like structure and configured to reserve a liquid high temperature plasma raw material, with part of the rotating element being immersed in the high temperature plasma raw material reserved in the first reserving vessel;
a raw material supplying mechanism configured to apply the liquid high temperature plasma raw material onto at least part of the flat surface of the rotating element upon a rotating movement of the rotating element;
an energy beam providing device configured to irradiate the high temperature plasma raw material with an energy beam; and
a film thickness controlling mechanism provided in the cover-like structure, the film thickness controlling mechanism including a U-shaped structure having a channel-like recess, the U-shaped structure being biased by an elastic body in a direction against the flat surface of the rotating element such that two opposite sides of the U-shaped structure contact the flat surface of the rotating element, a clearance between the rotating element and a bottom of the recess of the structure, which faces the rotating element, being set such that the liquid high temperature plasma raw material applied on the rotating element has a predetermined film thickness, the cover-like structure of the raw material supplying mechanism having an opening in a certain part of the cover-like structure such that the energy beam is directed to the flat surface of the rotating element, on which the high temperature plasma raw material is applied, through the opening of the cover-like structure, and extreme ultraviolet light generated upon irradiation of the energy beam is released from the opening of the cover-like structure, the cover-like structure having a scattering preventing member disposed to oppose a direction of a centrifugal force acting on the rotating element, which is caused to rotate by the rotation unit, and cover the rotating element, the extreme ultraviolet light source device further comprising a cooling unit configured to cool the liquid high temperature plasma raw material such that the liquid high temperature plasma raw material applied on the rotating element is transformed to a solid in and/or near a region where the rotating element is irradiated with the energy beam passing through the opening of the cover-like structure.

4. An extreme ultraviolet light source device comprising:
a disc-like rotating element;
a rotation unit configured to cause the rotating element to rotate about a rotation center shaft, which is perpendicular to a flat surface of the rotating element;
a cover-like structure configured to surround the rotating element with a gap;
a first reserving vessel disposed in the cover-like structure and configured to reserve a liquid high temperature plasma raw material, with part of the rotating element being immersed in the high temperature plasma raw material reserved in the first reserving vessel;
a raw material supplying mechanism configured to apply the liquid high temperature plasma raw material onto at least part of the flat surface of the rotating element upon a rotating movement of the rotating element;
an energy beam providing device configured to irradiate the high temperature plasma raw material with an energy beam; and
a film thickness controlling mechanism provided in the cover-like structure, the film thickness controlling mechanism including a U-shaped structure having a channel-like recess, the U-shaped structure being biased by an elastic body in a direction against the flat surface of the rotating element such that two opposite sides of the U-shaped structure contact the flat surface of the rotating element, a clearance between the rotating element and a bottom of the recess of the structure, which faces the rotating element, being set such that the liquid high temperature plasma raw material applied on the rotating element has a predetermined film thickness, the cover-like structure of the raw material supplying mechanism having an opening in a certain part of the cover-like structure such that the energy beam is directed to the flat surface of the rotating element, on which the high temperature plasma raw material is applied, through the opening of the cover-like structure, and extreme ultraviolet light generated upon irradiation of the energy beam is released from the opening of the cover-like structure, the cover-like structure having a scattering preventing member disposed to oppose a direction of a centrifugal force acting on the rotating element, which is caused to rotate by the rotation unit, and cover the rotating element, wherein the rotation center shaft of the rotating element is not perpendicular to a direction of a normal line to a liquid surface of the liquid high temperature plasma raw material reserved in the first reserving vessel, but crosses the direction of the normal line to the liquid surface of the liquid high temperature plasma raw material reserved in the first reserving vessel.

5. An extreme ultraviolet light source device comprising:

a disc-like rotating element;

a rotation unit configured to cause the rotating element to rotate about a rotation center shaft, which is perpendicular to a flat surface of the rotating element;

a cover-like structure configured to surround the rotating element with a gap;

a first reserving vessel disposed in the cover-like structure and configured to reserve a liquid high temperature plasma raw material, with part of the rotating element being immersed in the high temperature plasma raw material reserved in the first reserving vessel;

a raw material supplying mechanism configured to apply the liquid high temperature plasma raw material onto at least part of the flat surface of the rotating element upon a rotating movement of the rotating element;

an energy beam providing device configured to irradiate the high temperature plasma raw material with an energy beam; and a film thickness controlling mechanism provided in the cover-like structure, the film thickness controlling mechanism including a U-shaped structure having a channel-like recess, the U-shaped structure being biased by an elastic body in a direction against the flat surface of the rotating element such that two opposite sides of the U-shaped structure contact the flat surface of the rotating element, a clearance between the rotating element and a bottom of the recess of the structure, which faces the rotating element, being set such that the liquid high temperature plasma raw material applied on the rotating element has a predetermined film thickness, the cover-like structure of the raw material supplying mechanism having an opening in a certain part of the cover-like structure such that the energy beam is directed to the flat surface of the rotating element, on which the high temperature plasma raw material is applied, through the opening of the cover-like structure, and extreme ultraviolet light generated upon irradiation of the energy beam is released from the opening of the cover-like structure, the cover-like structure having a scattering preventing member disposed to oppose a direction of a centrifugal force acting on the rotating element, which is caused to rotate by the rotation unit, and cover the rotating element, wherein a surface texturing process is applied on at least one of two faces of the disc-like rotating element in a region irradiated with the energy beam, the two faces of the rotating element being perpendicular to the rotation center shaft of the rotating element.

6. An extreme ultraviolet light source device comprising:

a disc-like rotating element;

a rotation unit configured to cause the rotating element to rotate about a rotation center shaft, which is perpendicular to a flat surface of the rotating element;

a cover-like structure configured to surround the rotating element with a gap;

a first reserving vessel disposed in the cover-like structure and configured to reserve a liquid high temperature plasma raw material, with part of the rotating element being immersed in the high temperature plasma raw material reserved in the first reserving vessel;

a raw material supplying mechanism configured to apply the liquid high temperature plasma raw material onto at least part of the flat surface of the rotating element upon a rotating movement of the rotating element;

an energy beam providing device configured to irradiate the high temperature plasma raw material with an energy beam; and a film thickness controlling mechanism provided in the cover-like structure, the film thickness controlling mechanism including a U-shaped structure having a channel-like recess, the U-shaped structure being biased by an elastic body in a direction against the flat surface of the rotating element such that two opposite sides of the U-shaped structure contact the flat surface of the rotating element, a clearance between the rotating element and a bottom of the recess of the structure, which faces the rotating element, being set such that the liquid high temperature plasma raw material applied on the rotating element has a predetermined film thickness, the cover-like structure of the raw material supplying mechanism having an opening in a certain part of the cover-like structure such that the energy beam is directed to the flat surface of the rotating element, on which the high temperature plasma raw material is applied, through the opening of the cover-like structure, and extreme ultraviolet light generated upon irradiation of the energy beam is released from the opening of the cover-like structure, the cover-like structure having a scattering preventing member disposed to oppose a direction of a centrifugal force acting on the rotating element, which is caused to rotate by the rotation unit, and cover the rotating element, the extreme ultraviolet light source device further comprising a mechanism for applying a surface reforming process with plasma, the mechanism being configured to apply the surface reforming process to at least one of two faces of the disc-like rotating element in a region irradiated with the energy beam.

7. An extreme ultraviolet light source device comprising:

a disc-like rotating element;

a rotation unit configured to cause the rotating element to rotate about a rotation center shaft, which is perpendicular to a flat surface of the rotating element;

a cover-like structure configured to surround the rotating element with a gap;

a first reserving vessel disposed in the cover-like structure and configured to reserve a liquid high temperature plasma raw material, with part of the rotating element being immersed in the high temperature plasma raw material reserved in the first reserving vessel;

a raw material supplying mechanism configured to apply the liquid high temperature plasma raw material onto at least part of the flat surface of the rotating element upon a rotating movement of the rotating element;

an energy beam providing device configured to irradiate the high temperature plasma raw material with an energy beam; and a film thickness controlling mechanism provided in the cover-like structure, the film thickness controlling mechanism including a U-shaped structure having a channel-like recess, the U-shaped structure being biased by an elastic body in a direction against the flat surface of the rotating element such that two opposite sides of the U-shaped structure contact the flat surface of the rotating element, a clearance between the rotating element and a bottom of the recess of the structure, which faces the rotating element, being set such that the liquid high temperature plasma raw material applied on the rotating element has a predetermined film thickness, the cover-like structure of the raw material supplying mechanism having an opening in a certain part of the cover-like structure such that the energy beam is directed to the flat surface of the rotating element, on which the high temperature plasma raw material is applied, through the opening of the cover-like structure, and extreme ultraviolet light generated upon irradiation of the energy beam is released from the opening of the cover-like structure, the cover-like structure having a scattering preventing member disposed to oppose a direction of a centrifugal force acting on the rotating element, which is caused to rotate by the rotation unit, and cover the rotating element, the extreme ultraviolet light source device further comprising a liquid raw material circulating device, the liquid raw material circulating device including a second reserving vessel configured to reserve the high temperature plasma raw material, a raw material inflow conduit connected between the second reserving vessel and the first reserving vessel and configured to allow the high temperature plasma raw material to flow in the first reserving vessel from the second reserving vessel, a raw material outflow conduit connected between the second reserving vessel and the first reserving vessel and configured to allow the high temperature plasma raw material to flow in the second reserving vessel from the first reserving vessel, and a raw material drive unit configured to convey the high temperature plasma raw material to the first reserving vessel from the second reserving vessel, wherein the second reserving vessel of the liquid raw material circulating device is arranged such that a liquid surface of the liquid high temperature plasma raw material reserved in the second reserving vessel is lower than a liquid surface of the liquid high temperature plasma raw material reserved in the first reserving vessel when viewed in a gravity direction.

* * * * *